(12) United States Patent
Yumoto et al.

(10) Patent No.: US 9,007,691 B2
(45) Date of Patent: **\*Apr. 14, 2015**

(54) IMAGE DISPLAY SHEET AND IMAGE DISPLAY BODY

(75) Inventors: Yoshihide Yumoto, Tokyo (JP); Kazushi Omori, Tokyo (JP)

(73) Assignee: Grapac Japan Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/823,009

(22) PCT Filed: Dec. 19, 2011

(86) PCT No.: PCT/JP2011/079308
§ 371 (c)(1),
(2), (4) Date: Apr. 19, 2013

(87) PCT Pub. No.: WO2012/144110
PCT Pub. Date: Oct. 26, 2012

(65) Prior Publication Data
US 2014/0049829 A1    Feb. 20, 2014

(30) Foreign Application Priority Data

Apr. 22, 2011 (JP) .................................. 2011-96476

(51) Int. Cl.
*G02B 27/10* (2006.01)
*G02B 27/22* (2006.01)
(Continued)

(52) U.S. Cl.
CPC .............. *G02B 3/005* (2013.01); *G02B 3/0006* (2013.01); *G02B 3/0043* (2013.01);
(Continued)

(58) Field of Classification Search
CPC .............. G02B 27/00; G02B 27/0101; G02B 27/2214; G02B 3/0006; G02B 3/0043; G02B 3/005; G02B 3/0056; G02B 5/02; G02B 2027/0118; G02B 2027/012; G03B 21/28; G03B 25/02; G03B 35/24; B44F 1/10; B44F 7/00; B41M 3/148

USPC ................ 359/619, 620, 625, 626, 628, 376, 359/462–465, 454, 455, 458; 353/7, 38, 77; 348/241, 291; 396/324

See application file for complete search history.

(56) References Cited

U.S. PATENT DOCUMENTS 3,619,490 A * 11/1971 Usui ............................ 348/291
7,336,326 B2 * 2/2008 Kim et al. ...................... 349/95
(Continued)

FOREIGN PATENT DOCUMENTS

JP          7-77668 A       3/1995
JP       2003-344807 A    12/2003
(Continued)

OTHER PUBLICATIONS

International Search Report for PCT/JP2011/079308 dated Feb. 14, 2012.
(Continued)

*Primary Examiner* — Loha Ben
(74) *Attorney, Agent, or Firm* — Sughrue Mion, PLLC

(57) ABSTRACT

An object is to provide an image display sheet capable of realizing a smooth pseudo moving image and observing the image with reduced in discomfort. A configuration is provided in which a lenticular sheet composed of an arrangement of a plurality of cylindrical lenses 1a and an image forming layer 3 are laminated, and the image display sheet is formed capable of observing an image formed on the image forming layer 3 from the convex shape side of the cylindrical lenses 1a of the lenticular sheet, as a virtual image with movement, or movement and deformation. The image forming layer 3 is formed repeatedly with a plurality of images 3 for displaying virtual images in association with the cylindrical lenses 1a so as to correspond to the cylindrical lenses 1a, respectively, one-on-one, and difference between an arrangement pitch length A of the cylindrical lenses 1a and a pitch length B of the repeatedly formed images 3a formed on the image forming layer 3 is in a range of 0% to 10%.

21 Claims, 22 Drawing Sheets

(51) Int. Cl.
  *G03B 21/60* (2014.01)
  *G02B 3/00* (2006.01)
  *G03B 25/02* (2006.01)
  *G03B 35/24* (2006.01)
  *B41M 3/14* (2006.01)
  *B44F 1/10* (2006.01)

(52) U.S. Cl.
  CPC ........... *G02B 27/2214* (2013.01); *G03B 25/02* (2013.01); *G03B 35/24* (2013.01); *G02B 3/0056* (2013.01); *B41M 3/148* (2013.01); *B44F 1/10* (2013.01)

(56) References Cited

U.S. PATENT DOCUMENTS

| | | | | |
|---|---|---|---|---|
| 7,738,175 B2 * | 6/2010 | Steenblik et al. | ............. | 359/619 |
| 7,830,627 B2 * | 11/2010 | Commander et al. | ........ | 359/820 |
| 7,852,557 B2 * | 12/2010 | Tamai | ........................... | 359/463 |
| 7,974,006 B2 * | 7/2011 | Tamai | ........................... | 359/463 |
| 8,144,399 B2 * | 3/2012 | Steenblik et al. | ............. | 359/618 |
| 8,629,930 B2 * | 1/2014 | Brueckner et al. | ............ | 348/340 |
| 2011/0122499 A1 * | 5/2011 | Commander et al. | ........ | 359/626 |
| 2014/0085730 A1 * | 3/2014 | Yumoto et al. | ................ | 359/628 |

FOREIGN PATENT DOCUMENTS

| | | |
|---|---|---|
| JP | 2004-235926 A | 8/2004 |
| JP | 2006163189 | 6/2006 |
| JP | 2006-311422 A | 11/2006 |
| JP | 2007-271751 A | 10/2007 |
| JP | 2008-64938 A | 3/2008 |
| JP | 2009512885 | 3/2009 |
| JP | 2010-44213 A | 2/2010 |
| JP | 2011-5685 A | 1/2011 |
| JP | 2011-28073 A | 2/2011 |

OTHER PUBLICATIONS

International Preliminary Report dated Oct. 30, 2013 issued in Application No. PCT/JP2011/079308.

* cited by examiner

IMAGE DISPLAY SHEET AND IMAGE DISPLAY BODY

CROSS REFERENCE TO RELATED APPLICATIONS

This application is a National Stage of International Application No. PCT/JP2011/079308, filed on Dec. 19, 2011, which claims priority from Japanese Patent Application No. 2011-096476, filed on Apr. 22, 2011, the contents of all of which are incorporated herein by reference in their entirety.

FIELD OF THE INVENTION

The present invention relates to an image display sheet, and more particularly, to an image display sheet and an image display body using the image display sheet, which are capable of observing a virtual image with movement, or movement and deformation based on a cylindrical lens or flat convex lens and an image.

BACKGROUND TECHNOLOGY

There is known an image display sheet in which an image can be observed as a virtual image such as moving, changing and like with movement, or movement and deformation, by utilizing visual sense of an observer. The image display sheet is composed of a lenticular sheet which is constituted by an arrangement of a plurality of cylindrical lenses and an image forming layer.

FIGS. 26A and 26B are views for explaining a conventionally known image display sheet, in which FIG. 26A is a perspective view explaining a basic characteristic of a lenticular, and FIG. 26B is an illustrated view for explaining a basic principle of the lenticular.

A lenticular sheet 5001 is composed of cylindrical lenses 5002 and an image forming layer 5003 disposed on a surface opposite to a surface formed so as to provide a convex shape so that an image can be observed from a lens side in a pseudo-dynamic manner. In an arrangement, in shape of stripe, of an image 5004 for a right eye of an observer and an image 5005 for a left eye of the observer, a changing image in which an image is observed as if it moves by changing viewing angles of the observer (right eye and left eye of the observer 5006 and 5007).

FIG. 27 is for explaining a conventionally known image display sheet 5009, in which (A) is a view for explaining a section of a conventionally known image sheet 5009, and (B) is a plan view of the image forming layer 5003. On the image forming layer 5003 formed to an image forming medium 5008, a plurality of original picture A, B, C, D are divided into stripe shape. FIG. 27 is an example in which the image for right eye 5004 and the image for left eye 5005 are divided each at predetermined width with respect to the respective lenses. When moving a line of sight (visual line of an observer), an A-image is observed at a certain position, a B-image is observed at another certain position, a C-image is observed at a further certain position, and a D-image is observed at a further certain position, as if the image is moved by changing the viewing (observing) angles of an observer.

Further, the Patent Document 1 discloses a technology in which when a plurality of original images are divided into stripe shape to form one sheet of images so as to create images which are observed as if they have different pictures as viewed from different viewing angles, boundary of a pitch of a convex lens and divided boundary of the image is made coincident with each other.

In the meantime, the Patent Document 2 discloses a technology in which an image for right eye of an observer and an image for left eye of the observer are divided into strip-shaped pieces each having a predetermined width with respect to each lens, and then, by arranging the divided pieces in interlace shape, a pseudo variable image is observed.

PRIOR ART DOCUMENT

Patent Document

Patent Document 1: Japanese Patent Laid-open Publication No. 2003-344807
Patent Document 2: Japanese Patent Laid-open Publication No. 2010-044213

DISCLOSURE OF THE INVENTION

Problems to be Solved by the Invention

As a visual effect such as moving, changing using a lenticular is an observation of a single image with in an observational perspective of a constant range and an observation of a next image exceeding the constant range by varying the observational perspective angle. As mentioned above, according to the variation (changing) of the observing angles, different images are sequentially observed.

At this time, the images observed sequentially according to the changing of the observing angles design an appropriate animated expression with action, magnification, reduction deformation of human, animal or like, and in such case, an visual effect such as if a motion picture is obtainable.

In an image display sheet in a conventional technology, a virtual image of an eye can be observed. However, as the line of sight is changed by changing the viewing angles, the images are observed as if frame-by-frame advance. Thus, such images are not taken as smooth motion for an observer, and in a certain case, virtual images are observed intermittently, which will give a sense of discomfort to the observer, thus being inconvenient.

An object of the present invention, in consideration of the circumstances encountered in the conventional technologies mentioned above, is to provide image display sheet capable of realizing smooth pseudo moving image (dynamic image) and observing the image with reduced discomfort.

Means for Solving the Problem

An image display sheet according to the present invention is an image display sheet which is constituted by laminating a lenticular sheet composed of arrangement of a plurality of cylindrical lenses and an image forming layer, and in which an image formed on the image forming layer from a convex shape side of the cylindrical lenses of the lenticular sheet is formed to be observable as virtual image provided with movement, or movement and deformation, wherein: a plurality of images for observing virtual images for displaying the virtual image in association with the cylindrical lenses are formed repeatedly on the image forming layer so as to correspond to the cylindrical lenses respectively one-on-one; and a difference between an arrangement pitch length of the cylindrical lenses and a pitch length of the image for observing virtual image formed repeatedly on the image forming layer is in a range of not more than 10% with respect to the arrangement pitch length of the cylindrical lenses or the pitch length of the image for observing virtual image.

An image display sheet according to the present invention is an image display sheet, which is constituted by laminating a flat convex sheet composed of arrangement of a plurality of flat convex lenses and an image forming layer, and in which an image formed on the image forming layer from a convex shape side of the flat convex lenses of the flat convex lens sheet is formed to be observable as virtual image provided with movement, or movement and deformation, wherein: a plurality of images for observing virtual image for displaying the virtual image in association with the flat convex lenses are formed repeatedly on the image forming layer so as to correspond to the flat convex lenses respectively one-on-one; a difference between an arrangement pitch length in a horizontal direction of the flat convex lenses and a pitch length in a horizontal direction of the image for observing virtual image formed repeatedly on the image forming layer is in a range of not more than 4% with respect to the arrangement pitch length in the horizontal direction of the flat convex lenses or the pitch length in the horizontal direction of the image for observing virtual image; and a difference between an arrangement pitch length in a vertical direction of the flat convex lenses and a pitch length in a vertical direction of the image for observing virtual image formed repeatedly on the image forming layer is in a range of not more than 4% with respect to the arrangement pitch length in the vertical direction of the flat convex lenses or the pitch length in the vertical direction of the image for observing virtual image.

It may be preferred that the plurality of images for observing virtual image are composed of groups of images for observing virtual image each including a predetermined number of images for observing virtual image, each of other images for observing virtual image excluding images for observing virtual image located near a central portion of the groups of image for observing virtual image is provided with a cutout on the side of the image for observing virtual image near the central portion of the groups of image for observing virtual image, and sizes of cutouts increase as being apart in a distance from the image for observing virtual image near the central portion of the groups of image for observing virtual image.

It may be preferred that the plurality of images for observing virtual image are composed of groups of image for observing stand still virtual image each including a predetermined number of images for observing stand still virtual image at an end portion of the groups of image for observing virtual image, the image for observing stand still virtual image is provided with an enlarged portion, and at least one or more of the images for observing stand still virtual image, located on the end portion side of the groups of image for observing virtual image, among the images for observing stand still virtual image is provided with cutouts at both end portions in a vertical direction with respect to a direction along which the images for observing virtual image are arranged side by side.

It may be preferred that the plurality of images for observing virtual image are composed of groups of image for observing stand still virtual image each including a predetermined number of images for observing stand still virtual image at an end portion of the groups of image for observing virtual image, the image for observing virtual image stand still virtual image is provided with an enlarged portion on the side of the image for observing virtual image which is not the image for observing stand still virtual image, and at least one or more of the images for observing stand still virtual image, located on the end portion side of the groups of image for observing virtual image, among the images for observing stand still virtual image is provided with cutouts at both end portions in a vertical direction with respect to a direction along which the images for observing virtual image are arranged side by side.

It may be preferred that the virtual image is constituted to be observable as a stereoscopic virtual image in a manner of going up above the lenticular sheet or the flat convex lens sheet, or going down below the lenticular sheet or the flat convex lens sheet.

It may be preferred that one or a plurality of the other images, being the other images different from the images for observing virtual image, two-dimensional images or stereoscopic images displaying images to be observed in association with the cylindrical lenses or the flat convex lenses, changing images, or animation images, or images in combination thereof, are formed on the image forming layer, and comprising: one or a plurality of virtual image display portions displaying the virtual images based on the cylindrical lenses or flat convex lenses, and the images for observing virtual image; one or a plurality of image display portions to be observed displaying the images to be observed based on the two-dimensional images, the cylindrical lenses or the flat convex lenses, and the other images.

It may be preferred that the image forming layer is formed on a surface opposite to a surface having the convex shape of the cylindrical lenses of the lenticular sheet, or a surface opposite to a surface having a convex shape of the flat convex lenses of the flat convex sheet.

It may be preferred that an image forming medium having the image forming layer is provided, and a surface opposite to a surface having the convex shape of the cylindrical lenses of the lenticular sheet, or a surface opposite to a surface having a convex shape of the flat convex lenses of the flat convex sheet and a surface having the image forming layer of the image forming medium are laminated.

It may be preferred that the other convex lenses are provided on the convex shape side of the cylindrical lenses of the lenticular sheet or on the convex shape side of the flat convex lenses of the flat convex lens sheet, and there is adopted a configuration in which focal point accords with the image for observing virtual image through the other convex lenses, and the cylindrical lenses or flat convex lenses.

An image display body according to the present invention is an image display body wherein the image display sheet is partially or entirely formed so as to provide a circular-arc shape or cylindrical shape, and the image display sheet is formed in a state such that the convex shape side of the cylindrical lenses of the lenticular sheet of the image display sheet is bent so as to provide the circular-arc shape or cylindrical shape, with the convex shape side of the cylindrical lenses of the lenticular sheet facing outside or inside of the circular-arc or cylindrical shape, and in this state, an arrangement pitch length of the cylindrical lenses and a pitch length of the image for observing virtual image are equal.

An image display body according to the present invention is an image display body wherein the image display sheet is molded so as to provide a circular-arc shape in which the convex shape side of the cylindrical lenses of the lenticular sheet or the convex-shape side of the flat convex lenses of the flat convex lens sheet is located outside or inside of the circular-arc shape, and the image display body is composed of in combination of a plurality of the image display sheets, the image display sheet is molded so as to provide a circular-arc shape in a state that an arrangement pitch length of the cylindrical lenses and a pitch length of the image for observing virtual image are equal.

According to the present invention, it is possible to realize an image display sheet capable of realizing smooth pseudo moving image and observing the image with reduced discomfort.

According to the image display body of the present invention, it is possible to realize an image display body capable of observing pseudo moving image.

MODE FOR EMBODYING THE INVENTION

An image display sheet according to the present invention will be described hereunder with reference to the accompanying drawings.

Figure 1:
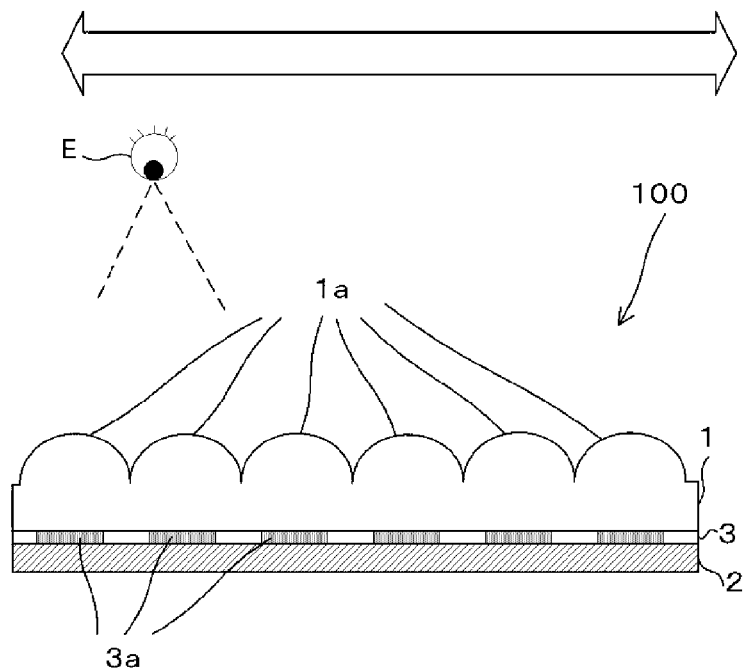
FIG. 1 is a sectional view of an image display sheet according to an embodiment of the present invention.

FIG. 1 is a sectional view showing an image display sheet according to an embodiment of the present invention.

An image display sheet 100 is composed of a lenticular sheet 1 and an image forming layer 3 as essential elements. In this embodiment, an example in which the image forming layer 3 is formed to an image forming medium such as paper will be explained. Respective layers for constituting the image display sheet 100 will be explained.

The lenticular sheet 1 is composed of a plurality of cylindrical lenses 1a, 1a, - - -, 1a that are arranged in parallel side by side. In the illustration of FIG. 1, the cylindrical lenses 1a constituting the lenticular sheet 1 are positioned on an upper side. Although a material forming the lenticular sheet 1 is not limited to a specific one as far as a material has been conventionally used for an image display sheet, a transparent resin material such as PET (polyethylene terephthalate), PP, PETG (grico denatured polyethylene terephthalate), acryl, acrylate group resin or like.

The image forming medium 2 is provided for the lenticular sheet 1 on a side opposite to the side on which the cylindrical lenses 1a having convex shape are not provided, and the image forming layer 3 is provided on the side of the lenticular sheet 1.

Although a material of the image forming medium 2 is not specifically limited as far as a material which has been conventionally used is used, paper, as a material of the image forming medium, such as coat (or coated) paper, synthetic paper, high quality paper, intermediate quality paper, impregnated paper, laminate (or laminated) paper, metal deposition paper, coated paper for printing, coated paper for recording or like will be used, and also, as a material of the image forming medium, polyethylene terephthalate film, polyethylene film, polypropylene film polycarbonate film or metal fail, or composite material thereof will be used. The material of the image forming medium 2 may be appropriately selected in accordance with required strength, usage or like as occasion demands.

The image forming layer 3 is a layer on which images 3a such as pictures, letters or like as images for virtual image observation is printed or transferred. The image forming layer 3 is provided on the side of the lenticular sheet 1 of the image forming medium 2. Although a material of the image forming layer 3 is not specifically limited, as far as the material is adhesive to the image forming medium 2, for example, material for ink, and such material for ink may include light storage ink or fluorescent ink.

Further, as the method of laminating the lenticular lens sheet 1 and the image forming medium 2 to which the image forming layer 3, there may be performed by utilizing known adhesion and/or sticking method based on materials of the image forming medium 2 and the image forming layer 3 as far as the laminated layer of the lenticular lens sheet 1 and the image forming layer 3 remain transparency. That is, there is adopted a method in which an observer (eye E of the observer) can observe the image 3a formed to the image forming layer 3 from the convex-shape side of the cylindrical lenses of the lenticular sheet 1. More specifically, a method, in which a virtual image in accordance with movement, or movement and deformation based on the image 3a formed to the image forming layer 3 can be observed, may be adopted.

Figure 2:
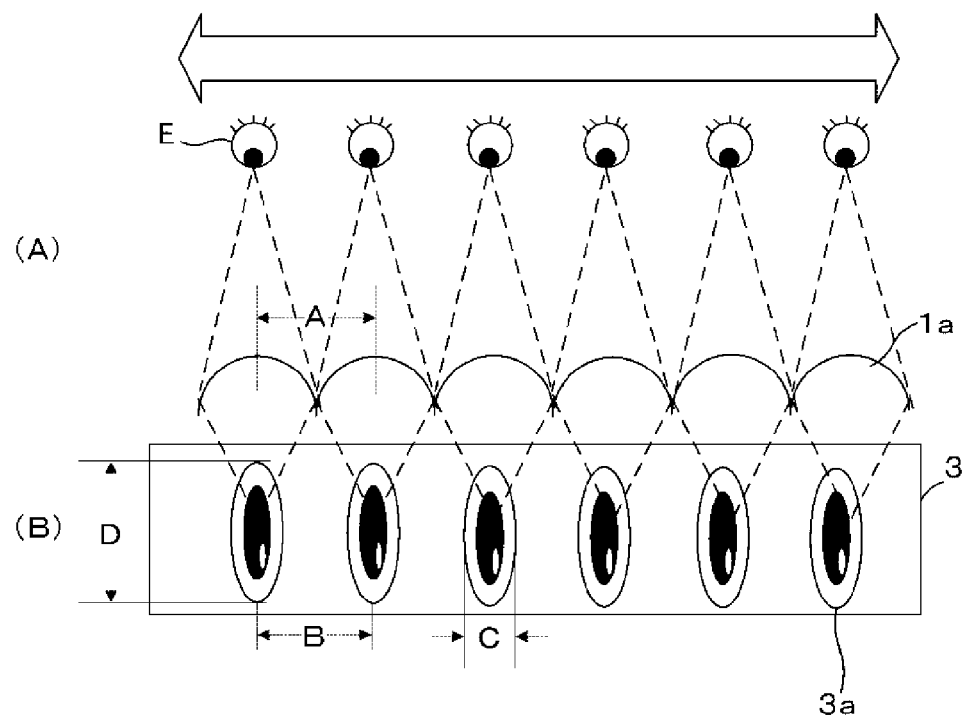
FIG. 2 is an illustration for explaining structure of the image display sheet according to the present embodiment, in which (A) is an explanatory view of a section of a lenticular sheet, and (B) is a plan view of an image forming layer.
Figure 3:
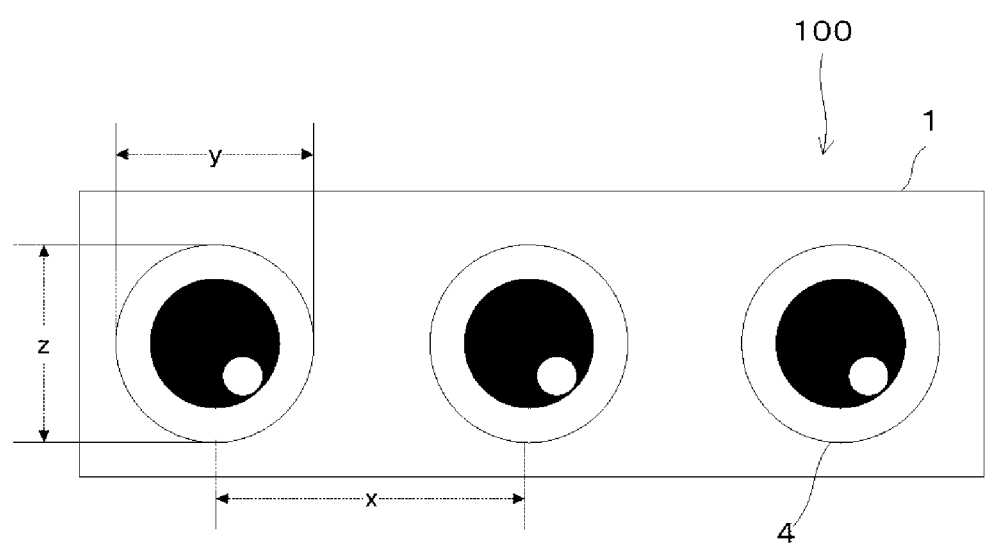
FIG. 3 is a plan view of the image display sheet according to the present embodiment.

FIG. 2 includes views for explaining structure or configuration of the image display sheet according to the present embodiment, in which FIG. 2(A) is a sectional view of the lenticular sheet, and FIG. 2(B) is a plan view of the image forming layer. FIG. 3 is a plan view of the image display sheet according to the present embodiment.

The example shown in FIG. 1 and FIG. 2(A) show a focusing condition of the respective cylindrical lenses 1a in a case where the observer views the cylindrical lenses 1a from a direction directly above the same at a time when the line of sight of the observer is moved by changing viewing angle of the observer in a direction of a white arrow. Further, in this case, focusing surface of the cylindrical lenses 1a exists on the image forming layer 3. In other words, the cylindrical lenses 1a are composed so that their focuses are concentrated on the image 3a. Further, in actual, the observer can confirm the smooth movement, or movement and deformation of the virtual image by changing the viewing angle as well as viewing from a direction directly above the image 3a.

As shown in FIG. 2(B), a plurality of images 3a are formed on the image forming layer 3. In the examples shown in FIGS. 2(A) and 2(B), the images 3a are formed repeatedly so as to correspond to the cylindrical lenses 1a, respectively, one-on-one, that is, the images 3a of six eyes correspond to the cylindrical lenses 1a, respectively.

An image display sheet is constructed so that a difference between a pitch length A of arrangement of the adjacent cylindrical lenses 1a and a pitch length B of the adjacent images 3a satisfies that the difference is within a range of 0% to 10% with respect to the pitch length A of the cylindrical lenses 1a or the pitch length B of the images 3a. That is, in a case where the pitch length A is equal to the pitch length B (A=B), the difference is 0% and in the case of pitch length A and the pitch length B are different from each other (A <B, or A>B), the difference is within a range of larger than 0% and less than 10%. Whether the pitch length A of the cylindrical lens arrangement (arrangement pitch length A of the cylindrical lenses) and the pitch length B of the images 3a are made equal to or different from each other may be preferably decided in accordance with aims of usage of the image display sheet. For example, in a case when the image display sheet is used in a bent manner, the cylindrical lenses 1a and the images 3a are formed such that the arrangement pitch length A of the cylindrical lenses 1a and the pitch length B of the images 3a are equal to each other (A=B) to thereby cause a desired difference in the pitch lengths when the image display sheet is bent. It is to be noted that an image display body in which the image display sheet is bent will be described hereinafter.

In the example of FIG. 2, the image display sheet is constructed so that the arrangement pitch length A of the adjacent cylindrical lenses 1a and the pitch length B of the adjacent images 3a are different from each other and so that the difference between the pitch lengths A and B is not more than 10%.

In the case the pitch length B of the images 3a is not more than the arrangement pitch length of the cylindrical lenses 1a (A>B), the virtual image 4 based on the cylindrical lenses 1a and the images 3a will be observed stereoscopically for the observer in a manner such that the virtual image 4 goes down below the lenticular sheet 1. In this case, when the line of sight of the observer is moved rightward, the virtual image 4 is also observed as is moved rightward, and on the other hand, when the line of sight of the observer is moved leftward, the virtual image 4 is also observed as is moved leftward. That is, the virtual image 4 is observed in the same direction as the moving direction of the line of sight of the observer.

On the other hand, in the case the pitch length B of the images 3a is not less than the arrangement pitch length of the cylindrical lenses 1a (A<B), the virtual image 4 based on the cylindrical lenses 1a and the images 3a will be observed stereoscopically for the observer in a manner such that the virtual image 4 goes up (floats) above the lenticular sheet 1. In this case, when the line of sight of the observer is moved rightward, the virtual image 4 is observed as is moved leftward, and on the other hand, when the line of sight of the observer is moved leftward, the virtual image 4 is observed as is moved rightward. That is, the virtual image 4 is observed in the direction reverse to the moving direction of the line of sight of the observer.

A pitch length "x" of the virtual image 4 shown in FIG. 3 is determined by the following equation (1). A width "y" of the virtual image 4 in the arrangement direction of the cylindrical lenses 1a is determined by the following equation (2). The character "A" is the pitch length of the arrangement of the cylindrical lenses 1a, the character "B" is the pitch length of the images 3a, the character "C" is a width (lateral size) of the image 3a in the direction of the arrangement of the cylindrical lenses 1a. In addition, height "z" (vertical size) of the image 3a in the direction vertical to the arrangement direction of the cylindrical lenses 1a is the same as a height "D" (vertical size) of the image 3a in the direction vertical to the arrangement direction of the cylindrical lenses 1a (equation (3)).

[Equations]

$$x = \frac{A^2}{|A-B|} \qquad \text{equation (1)}$$

$$y = \frac{A \times C}{|A-B|} \qquad \text{equation (2)}$$

$$z = D \qquad \text{equation (3)}$$

As mentioned above, the size of the virtual image 4 observed by the above equations (1) to (3) can be freely set by appropriately adjusting or changing the pitch length A of the arrangement of the cylindrical lenses 1a, the pitch length B of the images 3a, the width C of the image 3a in the direction of the arrangement of the cylindrical lenses 1a, and the height "D" of the image 3a.

Figure 4:
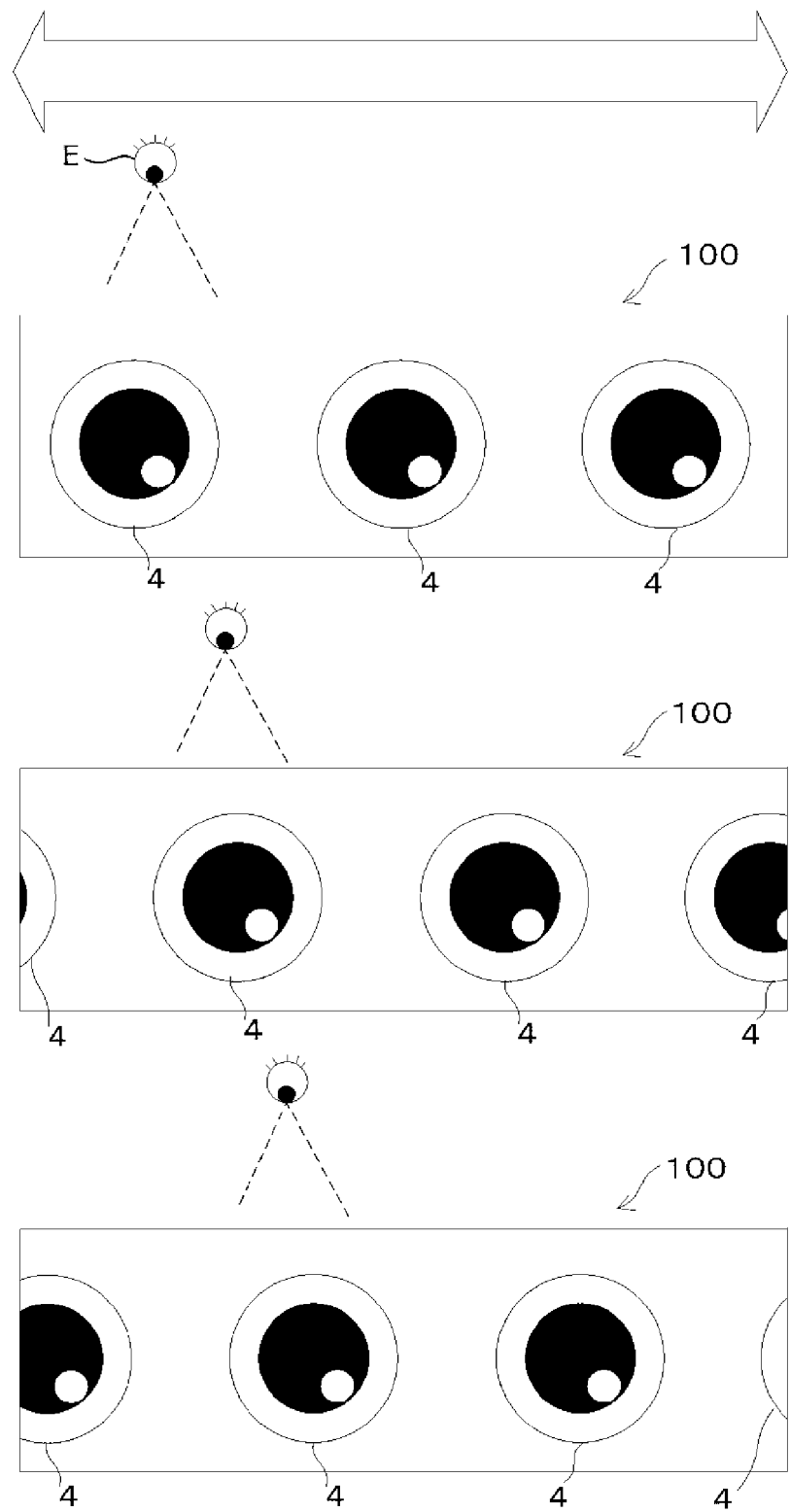
FIG. 4 is an explanatory view of a virtual image according to the present embodiment.

FIG. 4 is a view explaining the virtual image according to the present embodiment. As the observer moves while changing his line of sight by changing the viewing angle, the virtual images based on the images 3a formed on the image forming layer 3 and the virtual images 4 based on the images 3a formed on the image forming layer 3 and the cylindrical lenses 1a are observed.

More specifically, in the case the pitch length B of the images 3a is not more than the arrangement pitch length of the cylindrical lenses 1a (A>B), the virtual image 4 based on the cylindrical lenses 1a and the images 3a will be observed stereoscopically for the observer in a manner such that the virtual image 4 goes down below the lenticular sheet 1. In addition, following the movement of the line of sight of the observer, the virtual image 4 can be observed as a virtual image moving smoothly.

On the other hand, in the case when the pitch length B of the images 3a is not less than the arrangement pitch length of the cylindrical lenses 1a (A<B), the virtual image 4 based on the cylindrical lenses 1a and the images 3a will be observed stereoscopically for the observer in a manner such that the virtual image 4 goes up above the lenticular sheet 1. In addition, following the movement of the line of sight of the observer, the virtual image 4 can be observed as a virtual image moving smoothly.

In the equations (1) and (2), while the value |A−B| becomes smaller, moving speed with respect to the movement of the line of sight becomes faster. Therefore, it is preferred that the value |A−B| is determined in accordance with the use condition of the image display sheet 100, that is, in view of speed of the movement of the line of sight of the actual observer. In other words, it is preferred that the moving speed of the virtual image 4 is set so as to accord with the speed of the line of sight of the observer.

According to the present embodiment, a plurality of images 3a for displaying the virtual images in relation to the cylindrical lenses 1a are formed on the image forming layer 3 in a repeated manner so as to correspond to the cylindrical lenses 1a of the lenticular sheet 1, respectively, one-on-one. In addition, the images 3a are formed such that the arrangement pitch length A of the cylindrical lenses 1a and the pitch length B of the images 3a differ from each other, and the difference between these pitch lengths A and B is not more than 10% with respect to the arrangement pitch length A of the cylindrical lenses 1a or the pitch length B of the images 3a. Accordingly, as a result, the image display sheet capable of observing the virtual images 4 with smooth movement, or movement and deformation can be realized. In addition, since the image size (width C and height D) of the image 3a are approximately several tens μm to several tens mm, the image forming layer 3 can be printed and/or transferred to the image forming medium 2 by using a general equipment (for example, general-purpose printing machine, transferring machine, general-purpose image software and the like) without using dedicated equipment.

In a case where the lenticular sheet 1 having the arrangement pitch length A of the cylindrical lenses 1a is in a range of 330 μm to 345 μm is used, it is preferred that the difference between the arrangement pitch length A of the cylindrical lenses 1a and the pitch length B of the images 3a differs, by 0.1% to 4%, with respect to the arrangement pitch length A of the cylindrical lenses 1a or the pitch length B of the images 3a.

Further, although the images 3a are formed so as to substantially correspond to the cylindrical lenses 1a, respectively, one-on-one in a repeated manner, since the arrangement pitch length A of the cylindrical lenses 1a and the pitch length B of the images 3a differ from each other, the corresponding positions therebetween will gradually shift from each other. Thus, in this meaning, the cylindrical lenses 1a and the images 3a do not correspond actually one-on-one. The difference between the arrangement pitch length A of the cylindrical lenses 1a and the pitch length B of the images 3a makes it possible to observe the smooth virtual images.

(Embodiment of Image Display Sheet)

An embodiment of an actual image display sheet will be described hereunder, in which design examples of respective portions in a case when a virtual image of eye is observed will be explained.

Dimensions of the respective structural portions of the image display sheet are as follows.

Thickness of lenticular lens 1a: 0.45 mm
Arrangement pitch length A of cylindrical lenses: 336 μm
Pitch length B of images 3a: 330 μm
Difference between pitch lengths A and B: 6 μm
Width C of image 3a: 225 μm
Height D of image 3a: 12.7 mm
Pitch length x of virtual image: 19 mm
Width y of virtual image 4: 12.7 mm
Height z of virtual image 4: 12.7 mm (Other Embodiment 1)

An image display sheet 1 according to another one embodiment 1 has a structure capable of observing one virtual image. Further, descriptions concerning the similar structure of the embodiment mentioned above will be omitted herein.

Figure 5:
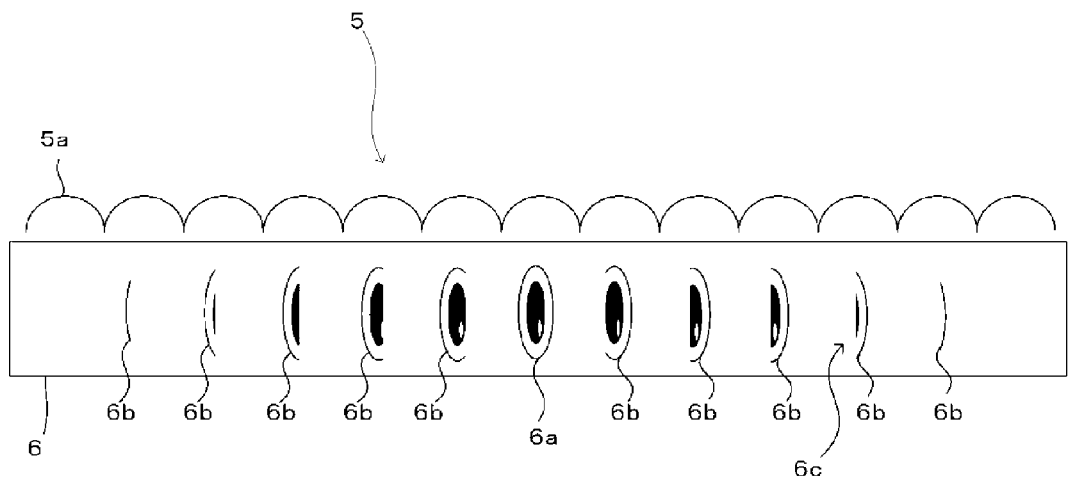
FIG. 5 is an illustration for explaining structure of the image display sheet according to another embodiment 1.
Figure 6:
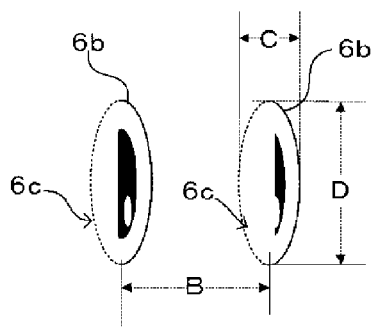
FIG. 6 is an illustration for explaining a pitch length measurement of an image 6b.
Figure 7:
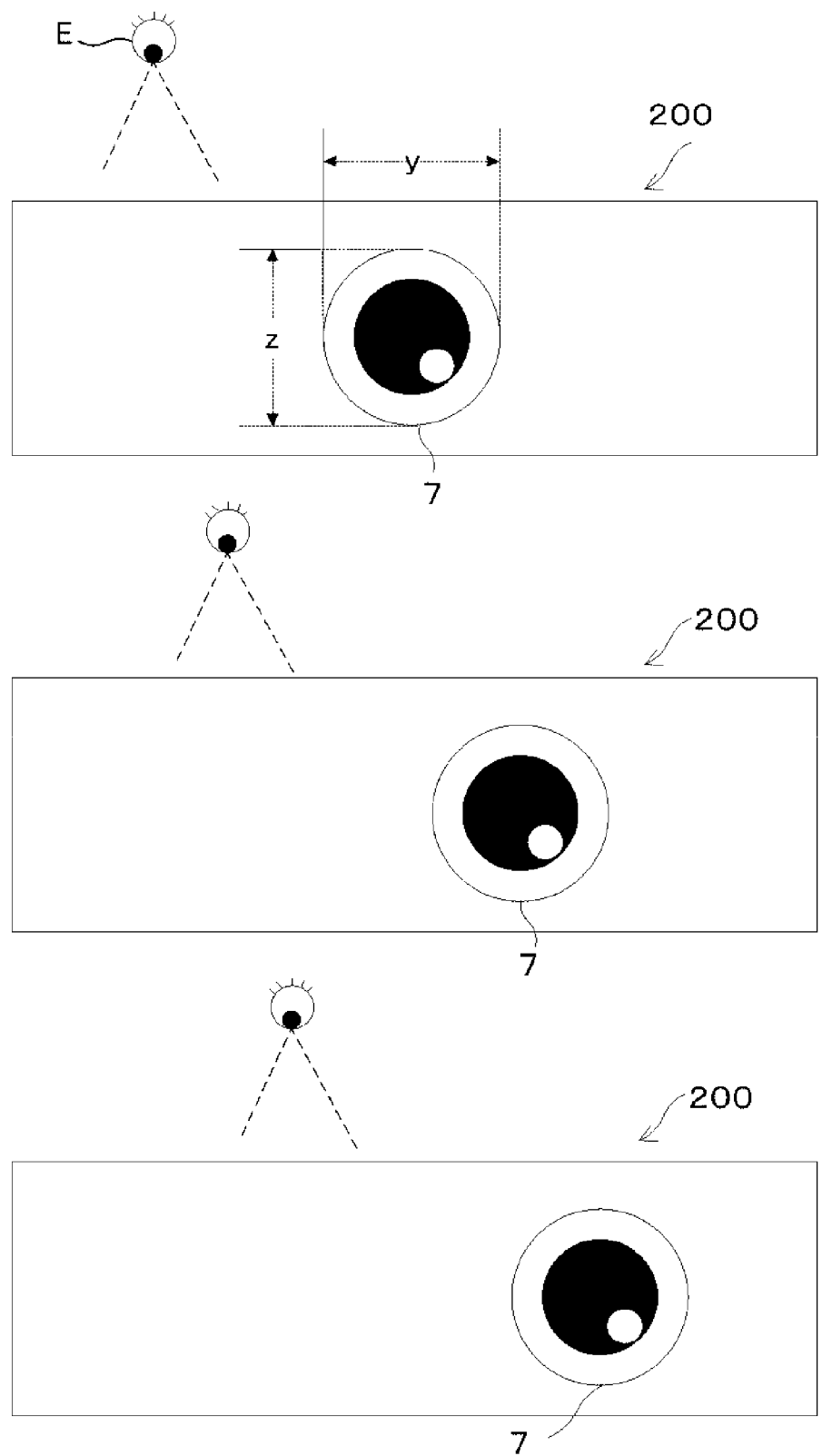
FIG. 7 is an explanatory view of a virtual image according to another embodiment 1.

FIG. 5 shows a structure or configuration of an image display sheet according to the other embodiment 1, in which the corresponding relationship between respective cylindrical lenses 5a of a lenticular sheet 5 and images 6a, 6b are shown. FIG. 6 is a view explaining a pitch length measurement of the image 6b. FIG. 7 is a view explaining a virtual image according to the other embodiment 1. Further, since the structure or configuration of the lenticular sheet 5 is similar to the lenticular sheet 1 mentioned hereinabove, the explanation thereof is now omitted herein.

On the image forming layer 6, a predetermined number of images as image group for virtual image observation are formed. The image 6a near the center of the image group is an image having no cutout, and each of other images 6b excluding the image 6a near the center has a cutout 6c on a side of the image 6a near the central portion. The images 6a and 6b are formed so as to correspond to the cylindrical lenses 5a, respectively, substantially one-on-one.

In an example shown in FIG. 5, the image group is composed totally of eleven (11) images including one image 6a near the central portion and ten (10) images 6b having cutouts 6c. The cutouts 6c become wider apart from the central image 6a towards laterally apart direction on the drawing. Further, although, in FIG. 5, only one image 6a at the central portion is shown, a plurality of images 6a may be adopted.

The images 6a and 6b are formed, as mentioned hereinbefore with reference to the embodiment, so as to substantially correspond to the cylindrical lenses 5a, respectively, one-on-one. Further, an image display sheet is constructed so that a difference between a pitch length A of arrangement of the adjacent cylindrical lenses 5a and a pitch length B of the images 6a and 6b satisfies that the difference is within a range of 0% to 10% with respect to the arrangement pitch length A of the cylindrical lenses 1a or the pitch length B of the images 6a and 6b.

It is herein noted that the pitch length B between the images 6a and 6b and the pitch length B between the images 6b are deemed as the pitch length B in a case of supposing that the image 6b is not provided with a cutout (FIG. 6).

Furthermore, the widths y and z of the observed virtual image will be determined on the basis of the equations (2) and (3) described hereinbefore. The width C and D are ones in a case of supposing that the images 6b have no cutout (FIG. 6). In a case when the widths C and D are obtained from the image 6b with no cutout, the lateral size of the image 6a is determined as the width C and the vertical size thereof is the height D.

Further, the image forming layer 6 may be formed to an image forming medium, not shown, and also, as in another embodiment 2 described herein after, may be formed directly to the lenticular sheet 5. In the case when the image forming layer 6 is formed on the image forming medium, the image forming medium has a structure or configuration identical to the image forming medium 2 described hereinbefore.

According to the structure mentioned above, an image display sheet 200 capable of observing only one virtual image 7 as shown in FIG. 7 can be realized. When a line of sight is being moved by changing a viewer's observing angle, one virtual image 7 in which the central image is distinctively displayed is observed as pseud moving image (graphics) based on the images 6a and 6b formed to the image forming layer and the cylindrical lenses 5a.

(Embodiment of Image Display Sheet)

An embodiment of an actual image display sheet according to another embodiment 1, in which design examples of respective portions in a case when a virtual image of eye is observed will be explained.

Dimensions of the respective structural portions of the image display sheet are as follows.

Thickness of lenticular lens 1a: 0.45 mm
Arrangement pitch length A of cylindrical lenses: 336 μm
Pitch length B between images 6a and 6b (and between 6b and 6b): 330 μm
Difference between pitch lengths A and B: 6 μm
Width C of image 6a (and 6b): 225 μm
Height D of image 6a (and 6b): 12.7 mm
Width y of virtual image 7: 12.7 mm
Height z of virtual image 7: 12.7 mm (Other Embodiment 2)

Figure 8:
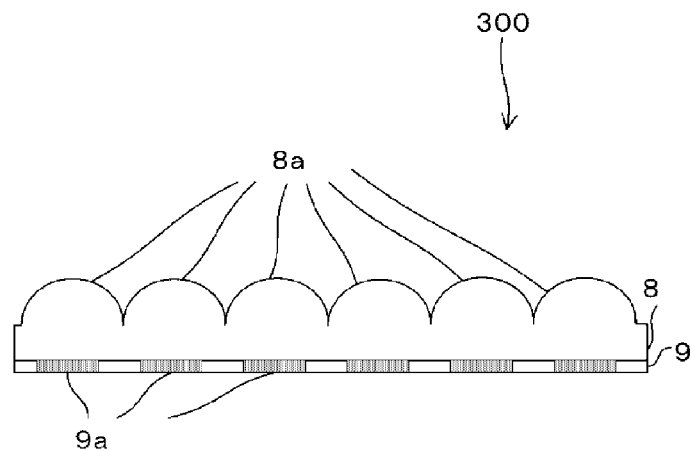
FIG. 8 is a sectional view of an image display sheet according to a further another embodiment 2.

FIG. 8 is a sectional view of an image display sheet according to other embodiment 2. In this other embodiment 2, an image display sheet 300 has a structure in which an image forming layer is formed to a lenticular sheet.

As shown in FIG. 8, the image display sheet 300 is provided with a lenticular sheet 8 and an image forming layer 9 as essential elements. The structure of the lenticular sheet 8 is the same as that of the lenticular sheet 1 mentioned hereinbefore, so that the description thereof is omitted herein.

The image forming layer 9 is a layer on which images 9a such as pictures, letters or like as images for virtual image observation is printed or transferred. The image forming layer 9 is provided on the surface on the side opposite to the surface on which convex-shaped cylindrical lenses 8a of the lenticular sheet 8. Although a material of the image forming layer 3 is not specifically limited, as far as the material is adhesive to the lenticular sheet 8, for example, known material for ink, and such material for ink may include light storage ink or fluorescent ink.

On the image forming layer 9, a plurality of images 9a are formed repeatedly so as to substantially correspond to the cylindrical lenses 8a one-on-one. Further, an image display sheet is constructed so that a difference between a pitch length A of arrangement of the cylindrical lenses 8a and a pitch length B of the images 9 satisfies that the difference is not more than 10% with respect to the arrangement pitch length A of the cylindrical lenses 8a or the pitch length B of the images 9. The other structures of the embodiment 2 are similar to those of the image forming layer 3 or the image forming layer 6, so that the explanations thereof are omitted herein. As mentioned above, the image forming layer 3 or the image forming layer 6 may be formed directly to the lenticular sheet 8.

(Other Embodiment 3)

It may be possible to combine the image display sheet with a stereoscopic viewing sheet. As such embodiment in which the image display sheet is combined with a stereoscopic viewing sheet will be explained as the other embodiment 3.

Figure 9:
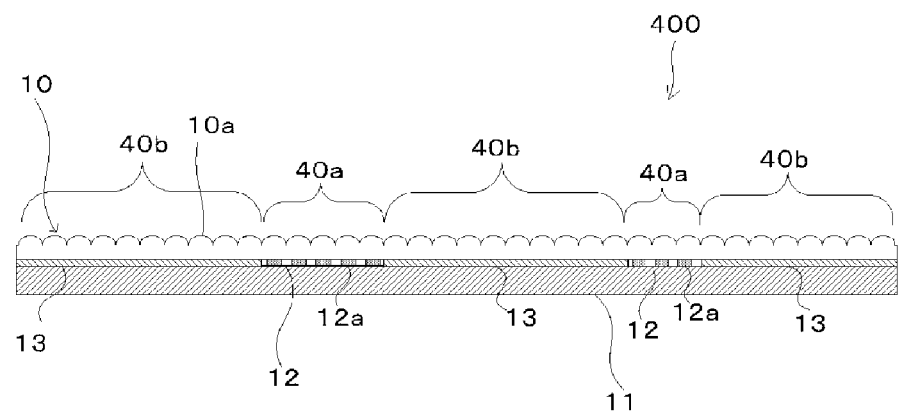
FIG. 9 is an explanatory view for explaining structure of an image display sheet according to a further another embodiment 3.
Figure 10:
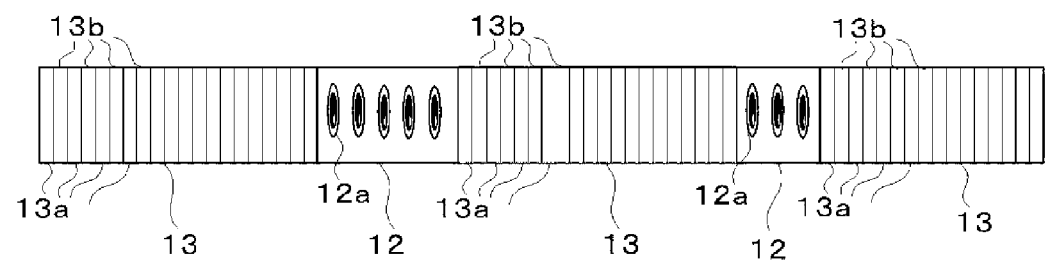
FIG. 10 is a plan view of an image forming layer.

FIG. 9 is a view for explaining a structure of an image display sheet according to the other embodiment 3. FIG. 10 is a plan view of an image forming layer. FIG. 9 shows a section of an image display sheet 400, which is composed of a virtual image display portion 40a and an image display portion 40b to be observed.

The virtual image display portion 40a is composed of the lenticular sheet 10 common to the display portion 40b of the image to be observed, an image forming medium 11 common to the display portion 40b of the image to be observed, and the image forming layer 12. The display portion 40b of the image to be observed (image display portion 40b for observation) is composed of the lenticular sheet 10 common to the virtual image display portion 40a, the image forming medium 11 common to the virtual image display portion 40a, and the image forming layer 13.

The lenticular sheet 10 has a structure similar to that of the lenticular sheet 1 mentioned above, the image forming medium 11 has a structure similar to that of the image forming medium 2 mentioned above, and the image forming layer 12 has a structure similar to that of the image forming layer 3 or image forming layer 6 mentioned above, so that the explanations thereof will be omitted herein. Further, in examples shown in FIGS. 9 and 10, images 12a as images for virtual image observation is formed on the image forming layer 12.

The image forming medium 11 is an image forming medium common to the virtual image display portion 40a and the image display portion 40b for observation. The image forming layers 12 and 13 are formed on the side of the lenticular sheet 10. The other structures of the image forming medium 11 are substantially identical or similar to that of the image forming medium 2 mentioned hereinbefore, and accordingly, the explanation thereof will be omitted herein.

The image display portion 40b for observation has substantially the same structure of the conventionally known lenticular display body and attains substantially the same effect as that attained thereby. The image forming layer 13 of the image display portion 40b for observation is a layer on which single or a plurality of other images, different from the image for observing the virtual image (image 12a in the present embodiment) are printed or transferred. The other images may herein include images for stereoscopic view, images for changing, and images picture patterns or letters or like as images of animation. In the example of FIG. 10, images 13a for left eye and images 13b for right eye displaying the images to be observed acting in association with the cylindrical lenses 10a of the lenticular sheet 10 are arranged in form of stripe. A material for the image forming layer 13 is not specifically limited as far as it closely adheres to the image forming medium 11, and for example, a conventionally known ink material or like will be used.

The lamination of the lenticular sheet 10 and the image forming medium 11 is performed by known adhesion method or sticking method in accordance with materials forming the image forming medium 11 and the image forming layers 12 and 13 with the transparency of the lenticular sheet 10 and the image forming layers 12 and 13 being maintained.

When an observer moves his (or her) line of sight by changing viewing angle from an upper position of the lenticular sheet 10, a virtual image is observed on the virtual image display portion 40a in associated action between the image of the image forming layer 12 and the cylindrical lens 10a, and an image for observing for virtual image is observed on the image display portion 40b for observation in associated action between the image of the image forming layer 13 and the cylindrical lens 10a.

As explained hereinabove, according to the present embodiment, the image display sheet 400 in combination of the virtual image display portion 40a capable of observing the virtual image and the image display portion 40b for observation capable of observing the image to be observed (observed image) can be constructed. Further, it is to be noted that although, in the explanations made with reference to FIGS. 9 and 10, a case of only two virtual image display portions 40a and three image display portions 40b for observation was exemplarily described for the sake of simple and easy understanding, a desired number of (plural or single) virtual image display portions 40a and a desired number of (plural or single) image display portion 40b for observation may be combined in accordance with the demand of design for the image display sheets.

According to the image display sheet 400 of the other embodiment 3, since the virtual image display portions 40a and the image display portions 40b for observation are composed of the same image forming medium 11, a stable image display sheet can be realized more easily. For example, in a case when an image display sheet on which a face of "kabuki" actor is displayed will be prepared, both eye portions are formed by the virtual image display portions 40a and portions other than both eyes are formed by the image display portions 40b for observation to thereby display the stereoscopic face of the "kabuki" actor in which only both eyes can be smoothly moved.

Further, in FIGS. 9 and 10, the image display portion 40b for observation is composed as a conventionally known lenticular display portion and constructed so that the stereoscopic image to be observed can be observed by the associated action between the images of the image forming layer 13 and the cylindrical lenses 10a. However, the present invention is not limited to such structure or configuration, and for example, a two-dimensional image, such as illustration, image of face, face picture or like, which is not an image attaining a specific effect by such as stereoscopic image or changing image in the associated action with a cylindrical lens, may be formed as the image display portion 40b for observation. For example, the two-dimensional image may be an image as a back scene of the virtual image display portion 40a. In the case of the two-dimensional image, the lenticular sheet 10 may not be provided for the image display portion 40b for observation.

(Other Embodiment 4)

According to the present embodiment, an image display sheet may be formed using a flat convex lens sheet. Hereafter, a case in which a flat convex lens sheet is used will be explained as the other embodiment 4.

Figure 11:
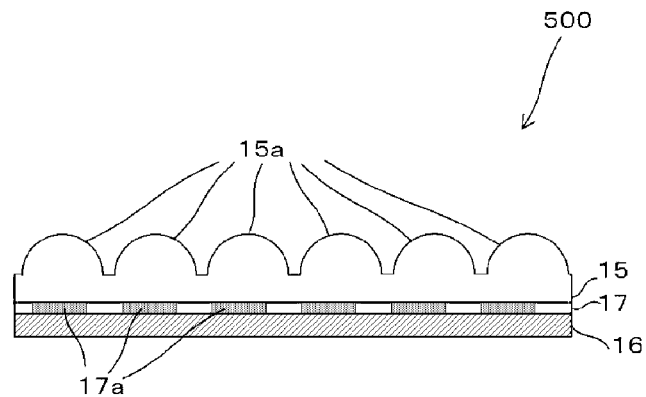
FIG. 11 is a sectional view of an image display sheet according to a further another embodiment 4.

FIG. 11 is a sectional view representing an image display sheet 500 according to the other embodiment 4. The image display sheet 500 is composed of a flat convex lens sheet 15 and an image forming layer 17 as essential components. Herein, an example in which an image forming layer 16 is formed to an image forming medium such as paper will be described. Respective layers constituting the image display sheet 500 will be explained hereunder.

The flat convex lens sheet 15 is formed by arranging a plurality of flat convex lenses 15a in form of honeycomb shape or square shape in a plan view. The flat convex lenses 15a are shown in an upper portion on the drawing of FIG. 11, for example. Further, although a material for the flat convex lens sheet 15 is not limited to specific one as far as a lens sheet which has been conventionally used as an image display sheet, a transparent resin material such as PET (polyethylene terephthalate), PP, PETG (glycol-denatured polyethylene terephthalate), amyl, acrylate series resin or like.

The image forming medium 16 is disposed on a side of the flat convex sheet 15 on which convex-shape is not formed, and the image forming layer 17 is formed on the flat convex sheet 15 side of the image forming medium 16. The other structures of the image forming medium 16 are substantially identical to those of the image forming medium 2 mentioned hereinbefore, so that the explanation thereof will be omitted herein.

The image forming layer 17 is a layer formed by printing or transferring an image 17a of a picture pattern or a letter as an image for virtual image observation. The image forming layer 17 is provided for the image forming medium 16 on the side of the flat convex lens. A material for the image forming layer 17 is not limited as far as the material closely adheres to the image forming medium 16, and for example, a conventionally known ink material may be utilized. The material for ink may include light storage ink or fluorescent ink. The other structures of the image forming layer 17 are substantially identical to those of the image forming layer 3 mentioned hereinbefore, so that the explanation thereof will be omitted herein.

A pint face of the flat convex lens 15a is on the image forming layer 17. In other words, the flat convex lens 15a is constructed so that a focal point thereof accords with the image 17a. Further, the lamination of the flat convex sheet 15 and the image forming medium 16 to which image forming layer 17 is provided is performed by a known adhesion method or sticking method in accordance with materials forming the image forming medium 16 and the image forming layer 17 with the transparency of the flat convex sheet 15 and the image forming layer 17 being maintained. Namely, it may be allowed for the flat convex sheet 15 to have a structure in which the image 17a formed to the image forming layer 17 can be observed by the observer from the side having the convex shape of the flat convex lens 15a of the flat convex sheet 15. More specifically, it may be allowed for the flat convex sheet 15 to have a structure in which a virtual image with the movement, or movement and deformation based on the image 17a formed to the image forming layer 17 can be observed.

Figure 12A:
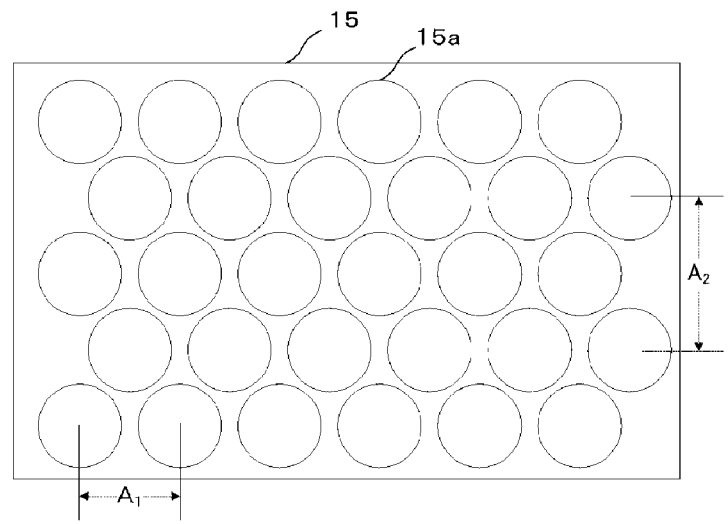
FIG. 12A is an explanatory view for explaining structure of an image display sheet according to the further another embodiment 4.
Figure 12B:
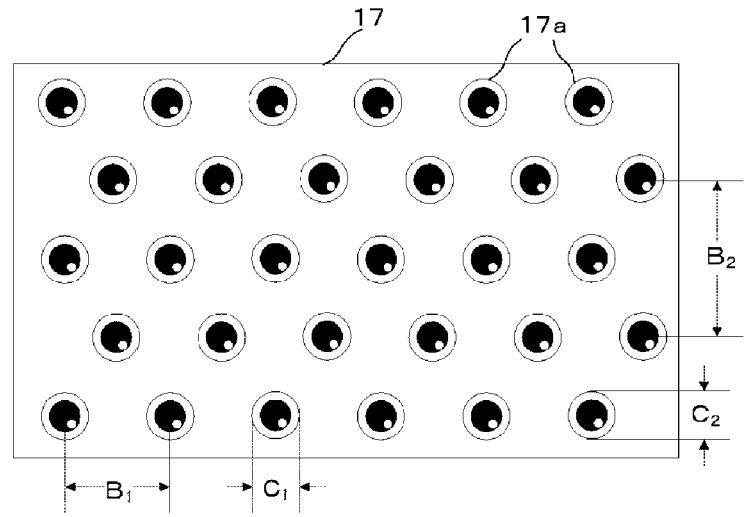
FIG. 12B is a plan view of an image forming layer.
Figure 13:
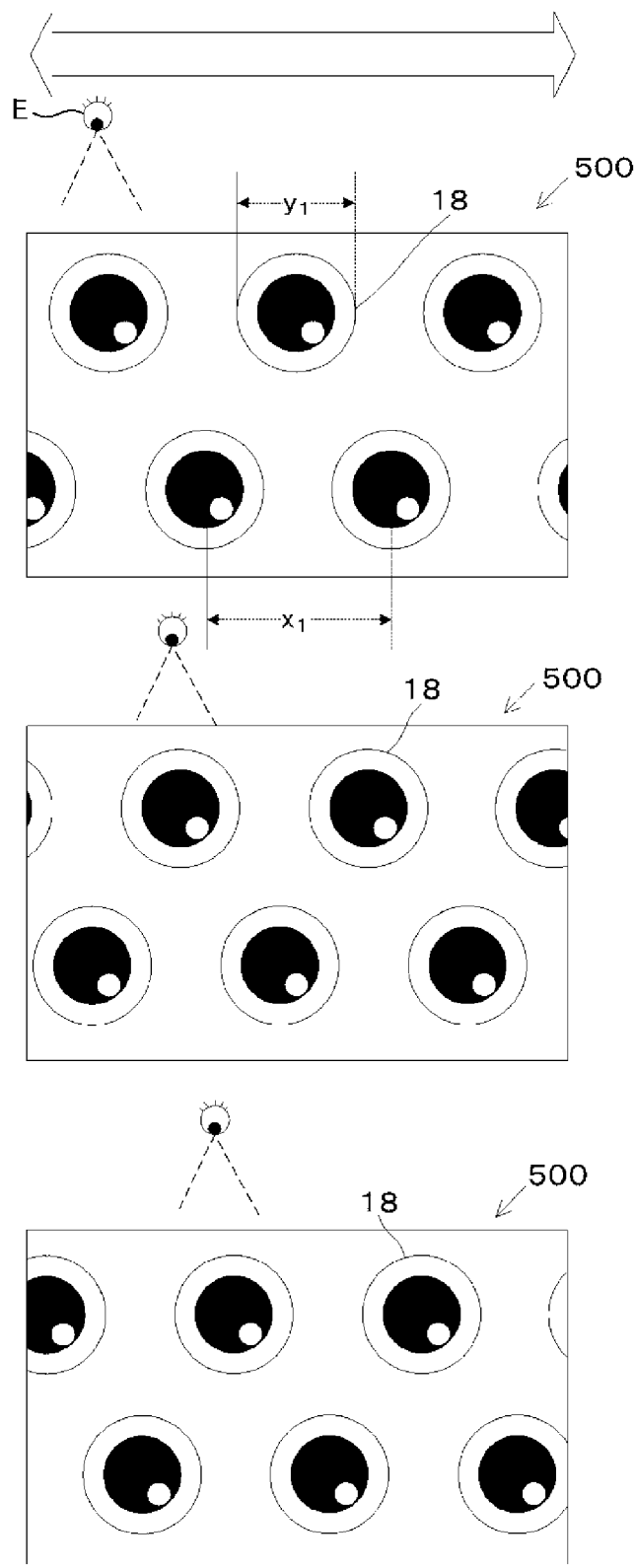
FIG. 13 is an explanatory view of a virtual image according to the further another embodiment 4.
Figure 14:
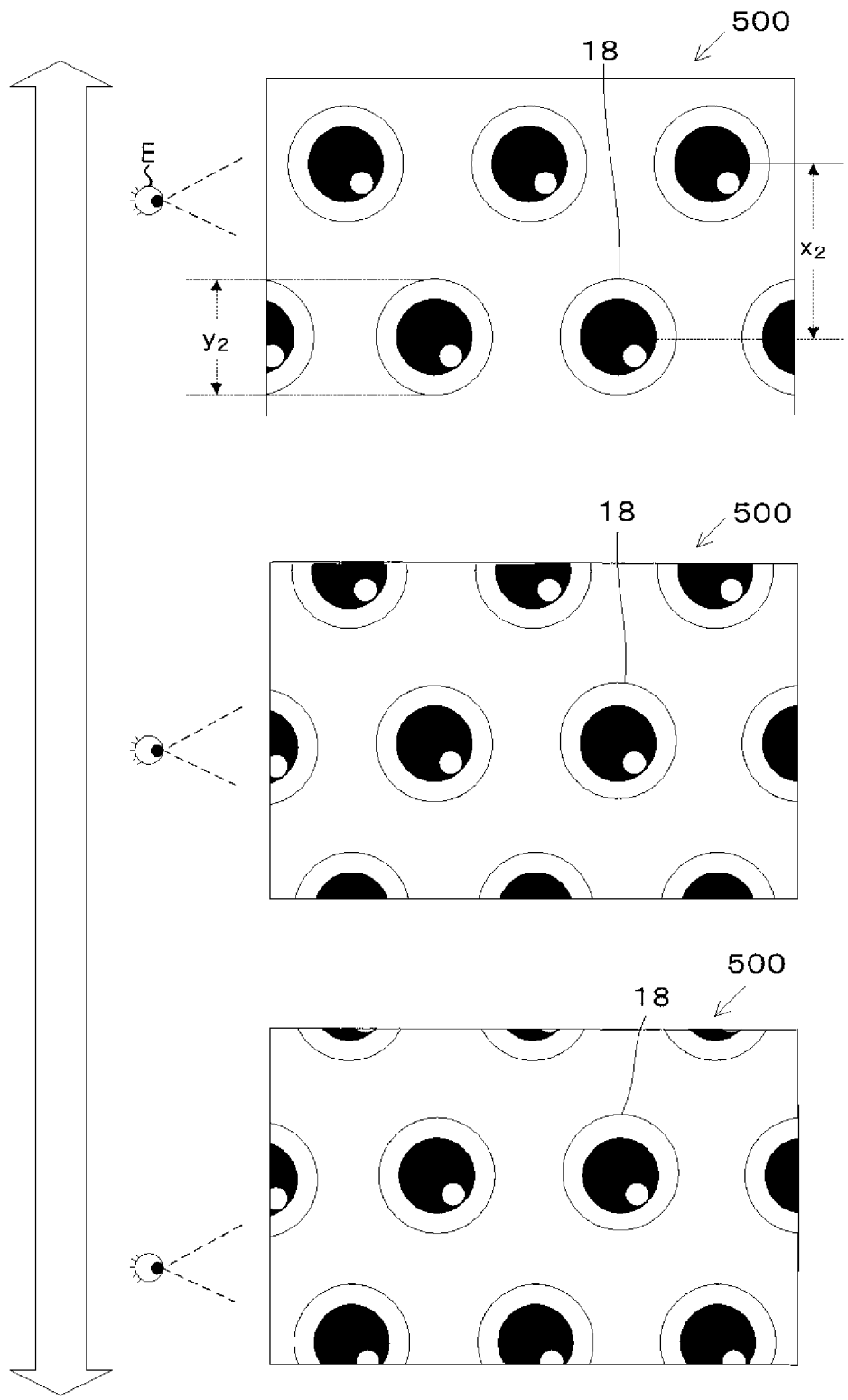
FIG. 14 is an explanatory view of a virtual image according to the further another embodiment 4.

FIG. 12A is a view for explaining a structure of the image display sheet according to the other embodiment 4. FIG. 12A is a plan view of the flat convex lens sheet, and FIG. 12B is a plan view of the image forming layer. FIG. 13 and FIG. 14 are views for explaining the structure of a virtual image according to the other embodiment 4.

The flat convex sheet 15 is formed with a plurality of flat convex lenses 15a. FIG. 12A shows an example of the flat convex lens sheet having honeycomb arrangement. As shown in FIG. 12B, a plurality of images 17a are formed to the image forming layer 17. The images 17a are formed in a repeated arrangement so as to substantially correspond to the flat convex lenses 15a, respectively, one-on-one. In the examples of FIGS. 12A and 12B, images 17a of thirty (30) eyes correspond respectively to the flat convex lenses 15a one-on-one.

The flat convex display sheet is constructed so that a difference between a pitch length of arrangement of the flat convex lenses 15a and a pitch length of the images 17a satisfies that the difference is not more than 10% with respect to the pitch length of the flat convex lenses 15a or the pitch length of the images 17a. In the examples of FIGS. 12A and 12B, the transverse arrangement pitch length $A_1$ (in figure) of the flat convex lenses 15a (horizontal direction) and the transverse pitch length $B_1$ of the images 17a differ from each other, and the difference is not more than 10% with respect to the pitch length $A_1$ of the flat convex lenses 15a or the pitch length $B_1$ of the images 17a. In addition, the vertical arrangement pitch length $A_2$ (in figure) of the flat convex lenses 15a (vertical direction) and the vertical pitch length $B_2$ of the images 17a differ from each other, and the difference is not more than 10% with respect to the pitch length $A_2$ of the flat convex lenses 15a or the pitch length $B_2$ of the images 17a.

That is, in a case where the pitch length $B_1(B_2)$ of the images 17a is smaller than the arrangement pitch $A_1(A_2)$ of the flat convex lenses 15a ($A_1>B_1$ and $A_2>B_2$), the virtual image 18 based on the flat convex lenses 15a and the images 17a will be observed stereoscopically for the observer in a manner such that the virtual image 18 goes down below the flat convex lens sheet 15. In this case, when the line of sight of the observer is moved rightward, the virtual image 18 is observed as is also moved rightward, and on the other hand, when the line of sight of the observer is moved leftward, the virtual image 18 is observed as is also moved leftward. That is, the virtual image 18 is observed in the same direction as the moving direction of the line of sight of the observer.

On the other hand, in the case the pitch length $B_1$ ($B_2$) of the images 17a is not less than the pitch length $A_1$ ($A_2$) of the arrangement of the flat convex lenses 15a ($A_1<B_1$ and $A_2<B_2$), the virtual image 18 based on the flat convex lenses 15a and the images 17a will be observed stereoscopically for the observer in a manner such that the virtual image 18 goes up above the flat convex lens 15. In this case, when the line of sight of the observer is moved rightward, the virtual image 18 is observed as is moved leftward, and on the other hand, when the line of sight of the observer is moved leftward, the virtual image 18 is observed as is moved rightward. That is, the virtual image 18 is observed in the direction reverse to the moving direction of the line of sight of the observer.

As shown in FIGS. 13 and 14, as an observer changes his (her) line of sight by changing the viewing angle, the virtual image 18 based on the image 17a formed to the image forming layer 17 and the flat convex lens 15a can be observed from an upper side. FIG. 13 shows a state of the virtual image in a case where the line of sight is moved in a horizontal direction, and FIG. 14 shows a state of the virtual image in a case where the line of sight is moved in a vertical direction.

A pitch length "$x_1$" of the virtual image 18 shown in FIG. 13 is determined by the equation (1). A width "$y_1$" of the virtual image 18 in the horizontal direction is determined by the equation (2). Herein, the character "A" is the pitch length $A_1$ of the arrangement of the flat convex lenses 15a, the character "B" is the pitch length $B_1$ of the images 17a in the horizontal direction, the character "C" is a width $C_1$ (lateral size) of the image 17a in the horizontal direction of the images 17a.

A pitch length "$x_2$" of the virtual image 18 shown in FIG. 14 is determined by the equation (1). A width "$y_2$" of the virtual image 18 in the vertical direction is determined by the equation (2). Herein, the character "A" is the pitch length $A_2$ of the arrangement of the flat convex lenses 15a, the character "B" is the pitch length $B_2$ of the images 17a in the vertical direction, the character "C" is a height $C_2$ (vertical size) of the image 17a in the vertical direction of the images 17a.

Further, in the equations (1) and (2), while the value |A−B| becomes smaller, the moving speed with respect to the movement of the line of sight of the observer becomes faster. Therefore, it is preferred that the value |A−B| is set in accordance with the use condition of the image display sheet 500, that is, in view of speed of the movement of the line of sight of the actual observer. In other words, it is preferred that the moving speed of the virtual image 18 is set so as to accord with the speed of the line of sight of the observer when the observer observes the virtual image 18 by moving his (her) line of sight.

According to the structures mentioned above, the image display sheet from which the smoothly moving virtual images can be observed by using the flat convex lens sheet. As the observer moves his (her) line of sight by changing the viewing angle, the virtual image 18 based on the images 17a formed to the image forming layer 17 and the flat convex lenses 15a.

Further, in the described embodiment, although the image forming layer 17 is formed to the image forming medium 16, the image forming layer 17 may be formed directly on a surface opposite to the surface to which the flat convex lens of the flat convex lens sheet 15 as being made with reference to the other embodiment 2 described hereinbefore.

Moreover, the image display sheet 500 may be constructed so that the images to be observed can be observed by the function based on the combination with a conventionally known stereoscopic viewing sheet with reference to the other embodiment 3 and the stereoscopic image, changing image, or animation image, or combination thereof. In such case, the images 17a function as images for the virtual image observation.

Furthermore, the image display sheet 500 may form an image display sheet for observing one virtual image on the basis of the other embodiment 1, which may be explained hereunder as the other embodiment 5.

(Other Embodiment 5)

An image forming layer in a case where only one virtual image is observed by using a flat convex lens sheet will be explained. It is further to be noted that a flat convex lens sheet and an image forming medium have the same or similar structures as those of the other embodiment 4.

Figure 15:
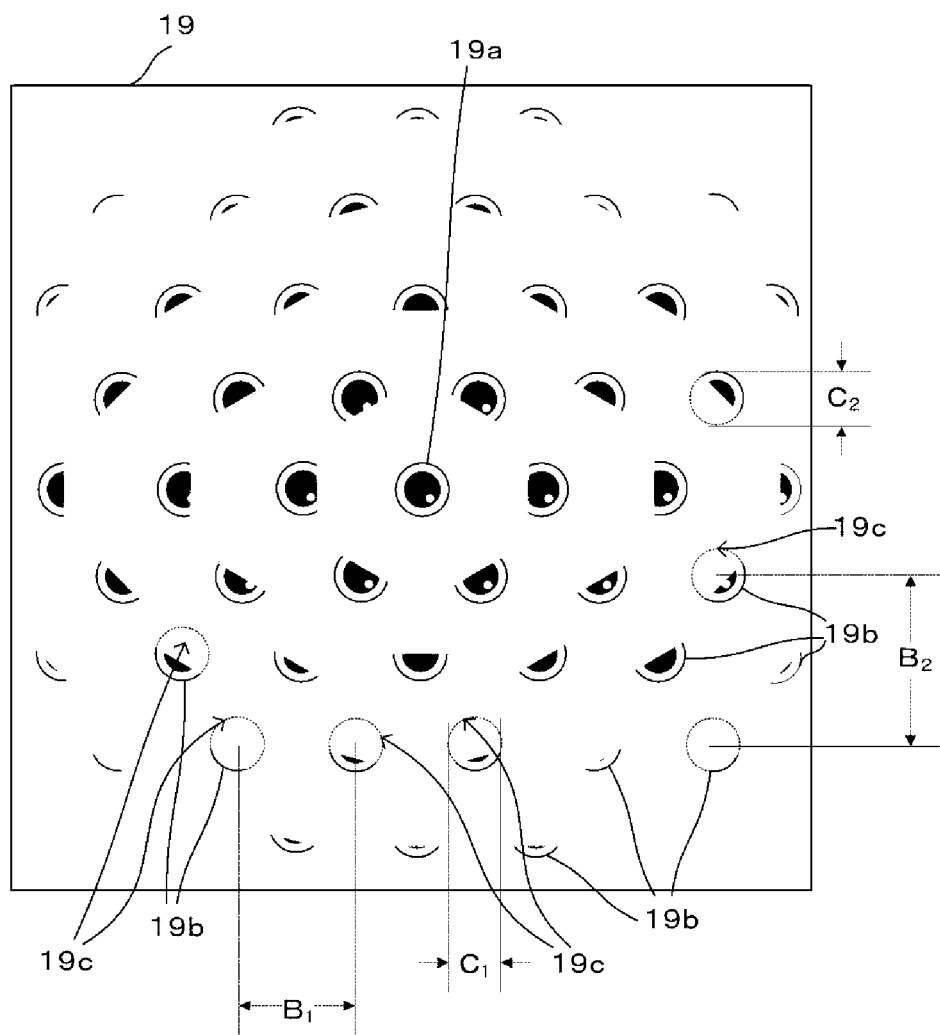
FIG. 15 is a plan view of an image forming layer of an image display sheet according to a further another embodiment 5.

FIG. 15 is a plan view representing an image forming layer of an image display sheet according to the other embodiment 5.

Predetermined number of images 19a and 19b as image group for virtual image observation are formed on an image forming layer 19. An image 19a disposed near a central portion of the image group is an image having no cutout, and other images 19b than the central one 19a each has a cutout 19c on the central image 19a side. The images 19a and 19b are formed so as to substantially correspond to a flat convex lens, not shown, one-on-one.

In the embodiment shown in FIG. 15, the image group is composed of the image 19a formed near the central portion of the image forming layer 19 and a plurality of images 19b having cutouts 19c. The cutout 19c of the image 19b becomes lager as the location of the images 19b becomes apart from the central image 19a. Further, in the example of FIG. 15, although one image 19a near the central portion is referred to, a plurality of images 19a may be formed near the central portion of the image forming layer 19.

The flat convex display sheet is constructed so that a arrangement pitch length of the flat convex lenses and pitch lengths of the images 19a and 19b differs and a difference between the arrangement pitch length of the flat convex lenses and the pitch lengths of the images 19a and 19b satisfies that the difference is not more than 10% with respect to the pitch length of the flat convex lenses or the pitch length of the images 19a and 19b. Specifically, it is constructed that the transverse arrangement pitch length $A_1$ of the flat convex lenses (horizontal direction) and the transverse pitch length $B_1$ of the images 19a differ from each other so that the difference therebetween is not more than 10% with respect to the pitch length $A_1$ of the flat convex lenses or the pitch length $B_1$ of the images 19a. In addition, the vertical arrangement pitch length $A_2$ of the flat convex lenses in the vertical direction and the vertical pitch length $B_2$ of the images 19a differ from each other so that the difference is not more than 10% with respect to the pitch length $A_2$ of the flat convex lenses or the pitch length $B_2$ of the images 19a. Further, the pitch length $B_1$ and $B_2$ between the image 19a and the image 19b, and the pitch length $B_1$ and $B_2$ between the images 19b are supposed to the pitch length $B_1$ and $B_2$ between the images 19b in a case of no formation of cutout 19c to the image 19b.

A pitch length "$x_1$" of the virtual image, not shown, in the horizontal direction is determined by the equation (1). A width "$y_1$" of the virtual image in the horizontal direction is determined by the equation (2). Herein, the character "A" is the pitch length $A_1$ of the arrangement of the flat convex lenses, the character "B" is the pitch length $B_1$ of the images 19a and 19b in the horizontal direction, the character "C" is a width $C_1$ (lateral size) of the image 19a and 19b in the horizontal direction.

A pitch length "$x_2$" of the virtual image, not shown, in the vertical direction is determined by the equation (1). A width "$y_2$" of the virtual image in the vertical direction is determined by the equation (2). Herein, the character "A" is the pitch length $A_2$ of the arrangement of the flat convex lenses, the character "B" is the pitch length $B_2$ of the images 19a and 19b in the vertical direction, the character "C" is a height $C_2$ (vertical size) of the image 19a and 19b in the vertical direction.

According to the structure explained hereinbefore, the image display sheet capable of observing only one virtual image smoothly moving by using the flat convex lenses can be realized. As a viewing line (line of sight) of the observer moves by changing the viewing angle of the observer, one virtual image in which the central image is extremely remarkably displayed, can be observed based on the images 19a, 19b formed on the image forming layer 19 and the flat convex lenses.

It is further to be noted that the above-mentioned embodiments may be executed by respectively combining them. For example, as to the other embodiment 3, the image forming layer may be directly formed on the surface opposite to the surface on which convex shape of the cylindrical lens of the lenticular sheet is formed in accordance with the other second embodiment. Furthermore, as to the other embodiments 4 and 5, the image forming layer may be directly formed on the surface opposite to the surface having the convex shape of the flat convex lenses of the flat convex lens sheet in accordance with the other second embodiment.

In the embodiments described above, although the examples are explained with the eye is an image for observing a virtual image (an image for observing virtual image), virtual images based on images of various picture patterns, letters and the like without limiting to the eyes can be observed. Especially, as an image for observing a virtual image, by using images of opened eye and closed eye, a virtual image with variation of opening/closing eyes can be observed. Moreover, various kinds or modes of virtual images with motion and variation can be realized by forming mouth opening/closing images or flower opening/closing images, or the like as images for observing virtual image. Hereunder, a case in which an image of an arrow is made as an image for observing virtual image will be explained with reference to FIG. 16.

(Other Embodiment 6)

Figure 16A:
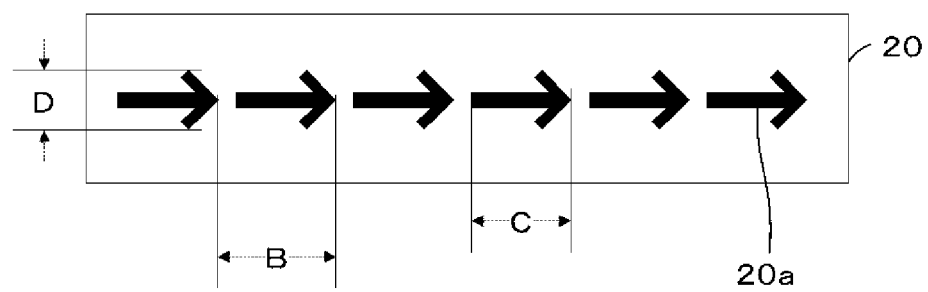
FIG. 16A is a plan view of an image forming layer of an image display sheet according to a further another embodiment 6.
Figure 16B:
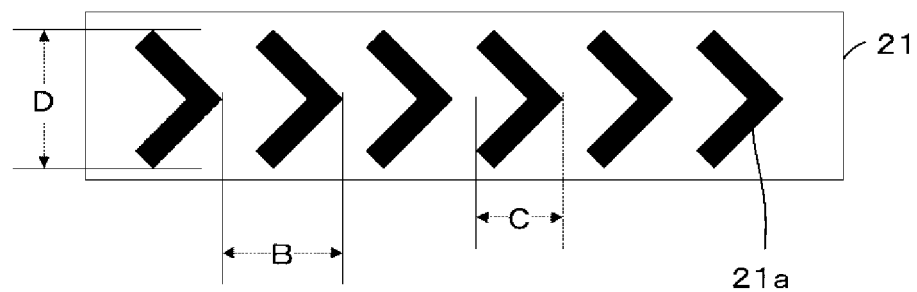
FIG. 16B is a plan view of an image forming layer of an image display sheet according to the further another embodiment 6.

FIGS. 16A and 16B are plan views representing an image forming layer of an image display sheet according to the other embodiment 6.

On an image forming layer 20 shown in FIG. 16A, a plurality of images 20a are formed as images for observing virtual images. The images 20a are formed in a repeated manner so as to be coincident with the cylindrical lenses, not shown, of the lenticular sheet approximately one-on-one arrangement. The arrangement pitch length of the cylindrical lenses and the pitch length B of the images 20a are made to be different so that the difference therebetween is not more than 10% with respect to the arrangement pitch length of the cylindrical lenses or pitch length B of the images 20a. Further, the image forming layer 20 may be formed to an image forming medium, not shown, or formed directly on the lenticular sheet as in the other embodiment 2. In the case where the image forming layer 20 is formed on the image forming medium, the image forming medium may have a structure substantially the same as or identical to the image forming medium 2 mentioned hereinbefore.

A virtual image showing an arrow based on the image 20a and the cylindrical lenses are observed from the upper side as a pseudo-moving image. In addition, by appropriately adjusting or changing the arrangement pitch length, the pitch length B of the image 20a, the width C in the arrangement direction of the cylindrical lenses of the image 20a, and the height D of the image 20a, the size of the virtual image to be observed based on the equations (1) to (3) mentioned hereinbefore can be freely set.

A plurality of images 21a as images for observing virtual image are formed on an image forming layer 21 shown in FIG. 16B. The configuration of the image 21a is substantially the same as or identical to that of the image 20a, and hence, the explanation thereof is omitted herein.

A virtual image showing an arrow based on the image 21a and the cylindrical lens, not shown, can be observed from an upper side of the lenticular sheet as a pseudo-moving image. In addition, by appropriately adjusting or changing the arrangement pitch length, the pitch length B of the image 21a, the width C in the arrangement direction of the cylindrical lenses of the image 21a, and the height D of the image 21a, the size of the virtual image to be observed based on the equations (1) to (3) mentioned hereinbefore can be freely set.

In a case where the pitch length B of the images 20a (or 21a), is smaller than the arrangement pitch A, not shown, of the flat cylindrical lenses (A>B), a virtual image representing an arrow based on the cylindrical lenses and the images 20a (or 21a) will be observed stereoscopically in a going down fashion of the lenticular sheet by an observer. In this case, when the line of sight of the observer is moved rightward, the virtual image representing an arrow is observed as is also moved rightward, and on the other hand, when the line of sight of the observer is moved leftward, the virtual image representing an arrow is observed as is also moved leftward. That is, the virtual image representing an arrow is observed in the same direction as the moving direction of the line of sight of the observer, and accordingly, it can be effectively utilized for the induction in the advancing direction.

On the other hand, in the case the pitch length B of the images 20*a* (or 21*a*) is larger than the arrangement pitch length A, not shown, of the cylindrical lenses (A<B), the virtual image representing an arrow based on the cylindrical lenses and the images 20*a* (or 21*a*) will be observed stereoscopically in a going up fashion by the observer. In this case, the virtual image rotated by 180 degrees of the images 20*a* (or 21*a*) will be observed by the observer. And when the line of sight of the observer is moved rightward, the virtual image representing an arrow is observed as is moved leftward, and on the other hand, when the line of sight of the observer is moved leftward, the virtual image representing an arrow is observed as is moved rightward. That is, the virtual image representing an arrow is observed in the direction reverse to the moving direction of the line of sight of the observer and accordingly, it can be effectively utilized for the induction in the direction reverse to the advancing direction.

A convex lens member such as flat convex lenses or meniscus lenses may be provided above the lenticular sheet, which will be explained hereunder with reference to the drawings accompanied.

(Other Embodiment 7)

An image display sheet of the other embodiment 7 has a structure in which flat convex lenses are provided above a lenticular sheet. It is further to be noted that descriptions of the same or identical structure as or to that of the above-mentioned embodiments will be omitted herein.

Figure 17A:
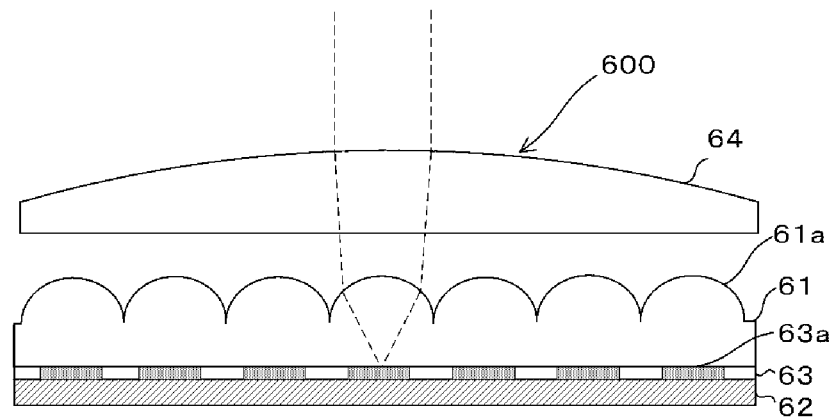
FIG. 17A is an explanatory view for explaining structure of an image display sheet according to a further another embodiment 7.

FIG. 17A is a view for explaining a structure of an image display sheet according to the other embodiment 7, and FIG. 17A is a sectional view thereof. The image display sheet 600 is provided, as essential components, with a lenticular sheet 61, an image forming layer 63 and a flat convex lens 64 as another convex lens.

The lenticular sheet 61 is composed of a plurality of cylindrical lenses 61*a* arranged side by side. The image forming medium 62 is disposed to a side of the lenticular sheet 61 on which convex-shape of cylindrical lenses is not formed, and the image forming layer 63 is formed on the lenticular sheet 61 side. The image forming layer 63 is a layer in which images 63*a* of picture pattern or letter as images for observing a virtual image are printed or transferred. The image forming layer 63 is provided for the image forming medium 62 on the lenticular sheet 61 side.

A flat convex lens 64 is disposed to the lenticular sheet 61 on the side of the cylindrical lenses 61*a* having convex shape. The flat convex lens 64 has a convex (protruded) shape on the side opposite to the lenticular sheet 61 (i.e., upper side in FIG. 17A). Further, although a material for the flat convex lens 64 is not limited to specific one, a transparent resin material such as glass, PET (polyethylene terephthalate), PP, PETG (glycol-denatured polyethylene terephthalate), amyl, acrylate series resin or like.

Figure 17B:
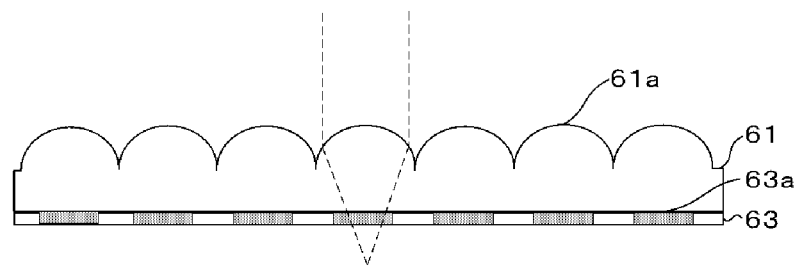
FIG. 17B is an illustrated sectional view of an essential portion representing a focusing process to a lenticular sheet.

FIG. 17B is a sectional view showing an essential portion of the lenticular sheet for showing a focusing condition thereof. A focal point by a single cylindrical lens 61*a* is converged at a point below the image forming layer 63. According to the functions of such cylindrical lenses 61*a* and the flat convex lens 64, the image display sheet of the present embodiment is constructed so that the focal point from the upper portion of the flat convex lens 64 accords with an image 63*a* formed on the image forming layer 63.

It is further to be noted that the other structure or configuration of the lenticular sheet 61 is substantially the same as that of the lenticular sheet 1 mentioned hereinbefore, and in addition, the structure of the image forming medium 62 is substantially the same as that of the image forming medium 2 mentioned hereinbefore, and the structure of the image forming layer 63 is substantially the same as that of the image forming layer 3 or image forming layer 6 mentioned hereinbefore.

As explained hereinabove, in the present embodiment, the flat convex lens 64 is provided as the other convex lens on the side of the cylindrical lenses 61*a*, at which the convex portions are formed, of the lenticular sheet 61 so that the focus accords with the image 63*a* through the flat convex lens 64 and the cylindrical lenses 61*a*. According to such arrangement, or structure, a smoothly moving virtual image can be observed by using the flat convex lens 64 and the cylindrical lenses 61*a*. It is prevented for an observer to directly touch the surface of the cylindrical lenses 61*a* of the lenticular sheet 61. In addition, in a case of a virtual image being an eye, in accordance with the shape of the flat convex lens 64, an image display sheet 600 visually and sensitively approximated to the eye may be composed.

Further, in the example of FIG. 17A, the flat convex lens 64 of the image display sheet 600 is constructed in a manner of being apart from the cylindrical lenses 61*a* of the lenticular sheet 61 by a predetermined distance, but in the present invention, the flat convex lens may be arranged in contact to the cylindrical lenses 61*a* on the upper surface thereof.

Figure 17C:
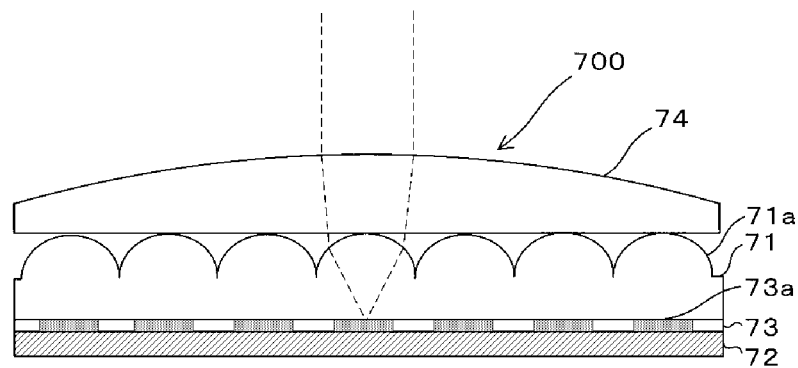
FIG. 17C is an illustration of an image display sheet having different arrangement in position of a flat convex lens.

FIG. 17C shows an example of an image display sheet in which an arrangement of the flat convex lens is different from that shown in FIG. 17A. The image display sheet 700 shown in FIG. 17C is provided, as essential components, with a lenticular sheet 71, an image forming layer 73 and a flat convex lens 74 as another convex lens. It is further to be noted that the structure or configuration of the lenticular sheet 71 is substantially the same as that of the lenticular sheet 61 mentioned hereinbefore, and in addition, the structure of the image forming medium 72 is substantially the same as that of the image forming medium 62 mentioned hereinbefore, the structure of the image forming layer 73 is substantially the same as that of the image forming layer 63, and the structure of the image 73*a* is substantially the same as that of the image forming layer 63*a*.

The flat convex lens 74 is disposed on the cylindrical lenses 71*a* constituting the lenticular sheet 71 in a manner of contacting to the upper surface thereof.

As explained hereinabove, the flat convex lens 74 as the other convex lens may be arranged or provided on the convex-shaped side of the cylindrical lenses 71*a* of the lenticular sheet 71 in a manner of being apart from the cylindrical lenses 71*a* by a predetermined distance (FIG. 17A), or may be disposed in contact to the cylindrical lenses 71*a* (FIG. 17C).

(Other Embodiment 8)

An image display sheet according to the other embodiment 8 has a structure provided with a meniscus lens above a lenticular sheet. Further, it is to be noted that the descriptions of the structures or configurations substantially the same as or similar to those of the above embodiment will be omitted herein.

Figure 18A:
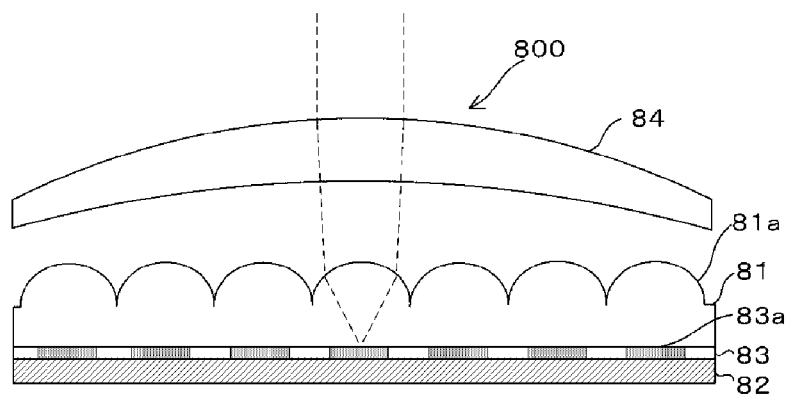
FIG. 18A is an explanatory view for explaining structure of an image display sheet according to a further another embodiment 8.

FIG. 18A is a view for explaining a structure of an image display sheet according to the other embodiment 8, and FIG. 18A is a sectional view thereof. The image display sheet 800 shown in FIG. 18A is provided, as essential components, with a lenticular sheet 81, an image forming layer 83 and a meniscus 84 as another convex lens.

The lenticular sheet 81 is composed of a plurality of cylindrical lenses 81*a* arranged side by side. The image forming medium 82 is disposed to a side of the lenticular sheet 81 on which convex-shape of cylindrical lenses is not formed, and the image forming layer 83 is formed on the lenticular sheet 81 side. The image forming layer 83 is a layer in which images 83a of picture pattern or letter as images for observing a virtual image are printed or transferred. The image forming layer 83 is provided for the image forming medium 82 on the lenticular sheet 81 side.

A meniscus 84 is disposed to the lenticular sheet 81 on the side of the cylindrical lenses 81a having convex shape. The meniscus lens 84 has a convex (protruded) shape on the side opposite to the lenticular sheet 81 (i.e., upper side in FIG. 18A). Further, although a material for the meniscus lens 84 is not limited to specific one, a transparent resin material such as glass, PET (polyethylene terephthalate), PP, PETG (glycol-denatured polyethylene terephthalate), amyl, acrylate series resin or like.

A focal point by a single cylindrical lens 81a is converged at a point below the image forming layer 83, and since the focusing condition of the single cylindrical lens 81a is the same as that of the cylindrical lens 71a shown in FIG. 17B, the illustration thereof is now omitted herein. According to the functions of such cylindrical lenses 81a and the meniscus lens 84, the image display sheet of the present embodiment is constructed so that the focal point from the upper portion of the meniscus lens 84 accords with an image 83a formed on the image forming layer 83.

It is further to be noted that the other structure or configuration of the lenticular sheet 81 is substantially the same as that of the lenticular sheet 61 mentioned hereinbefore, and in addition, the structure of the image forming medium 82 is substantially the same as that of the image forming medium 62 mentioned hereinbefore, and the structure of the image forming layer 83 is substantially the same as that of the image forming layer 63.

As explained hereinabove, in the present embodiment, the meniscus 84 is provided as the other convex lens on the side of the cylindrical lenses 81a, at which the convex portions are formed, of the lenticular sheet 81 so that the focal point accords with the image 83a through the flat meniscus 84 and the cylindrical lenses 81a. According to such arrangement, or structure, a smoothly moving virtual image can be observed by using the meniscus lens 84 and the cylindrical lenses 81a. It is prevented for an observer to directly touch the surface of the cylindrical lenses 81a of the lenticular sheet 81. In addition, in a case of a virtual image being an eye, in accordance with the shape of the meniscus lens 84, an image display sheet 800 visually and sensitively approximated to the eye may be composed.

Further, in the example of FIG. 18A, the meniscus lens 84 of the image display sheet 800 is constructed in a manner of being apart from the cylindrical lenses 81a of the lenticular sheet 81 by a predetermined distance, but in the present invention, the meniscus lens may be arranged in contact to the cylindrical lenses on the upper surface thereof.

Figure 18B:
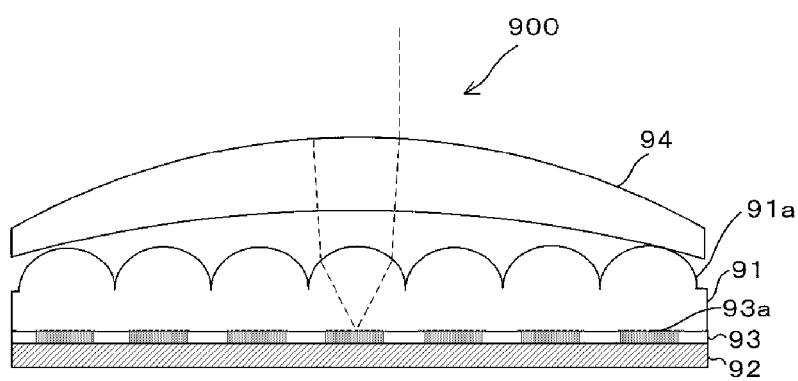
FIG. 18B is an illustration of an image display sheet having different arrangement in position of a flat convex lens.

FIG. 18B shows an example of an image display sheet in which an arrangement of the meniscus lens is different from that shown in FIG. 18A. The image display sheet 900 shown in FIG. 18B is provided, as essential components, with a lenticular sheet 91, an image forming layer 93 and a meniscus lens 94 as another convex lens. It is further to be noted that the structure or configuration of the lenticular sheet 91 is substantially the same as that of the lenticular sheet 81 mentioned hereinbefore, and in addition, the structure of the image forming medium 92 is substantially the same as that of the image forming medium 82 mentioned hereinbefore, the structure of the image forming layer 93 is substantially the same as that of the image forming layer 83, and the structure of the image 93a is substantially the same as that of the image forming layer 83a.

The meniscus lens 94 is disposed on the cylindrical lenses 91a constituting the lenticular sheet 91 in a manner of contacting to the upper surface thereof.

As explained hereinabove, the meniscus lens 94 as the other convex lens may be arranged or provided on the convex-shape side of the cylindrical lenses 91a of the lenticular sheet 91 in a manner of being apart from the cylindrical lenses 91a by a predetermined distance (FIG. 18A), or may be disposed in contact with the cylindrical lenses 91a (FIG. 18B).

With the other embodiments 7 and 8, although there have been explained examples using the flat convex lens and the meniscus lens, the present invention is not limited to the use of the flat convex lens and the meniscus lens. For example, a convex-shaped glass plate, plastic plate, or like may be used as far as ones are capable of focusing the focal point to an image of an image forming layer in cooperation with the cylindrical lenses. Further, it may be possible to directly form the image forming layer on the lenticular sheet as in the other embodiment 2 mentioned hereinbefore. Moreover, there may be adopted a structure in which, in combination with a conventionally known stereoscopic image sheet as in the other embodiment 3 described hereinbefore, an image to be observed can be made as observable image by the function of a stereoscopic viewing image, a changing image or animation image, or combination thereof. Still furthermore, a flat convex lens sheet may be used as in the other embodiments 4 and 5. Still furthermore, in the other embodiments 7 and 8, although there is adopted a structure in which convex surface of the flat convex lens or meniscus lens is positioned on a side reverse (upper side in the drawings) to the lenticular sheet, if it is possible to accord the focal point with the image of the image forming layer in an associated function of the cylindrical lens, it may be possible for the convex surface of the flat convex lens or meniscus lens to be directed to the lenticular sheet side (lower side in the drawings). In a case when the flat convex lens sheet is used in accordance with the other embodiments 4 and 5, it may be possible for the convex surface of the flat convex lens or meniscus lens to be directed to the side opposite to the flat convex lens sheet.

(Other Embodiment 9)

An image display sheet according to the other embodiment 9 is constituted so that a virtual image smoothly moving in accordance with the line of sight of an observer is to be made stationary. Further, the structures same as or similar to those of the above-mentioned embodiments will be omitted in description herein.

Figure 19A:
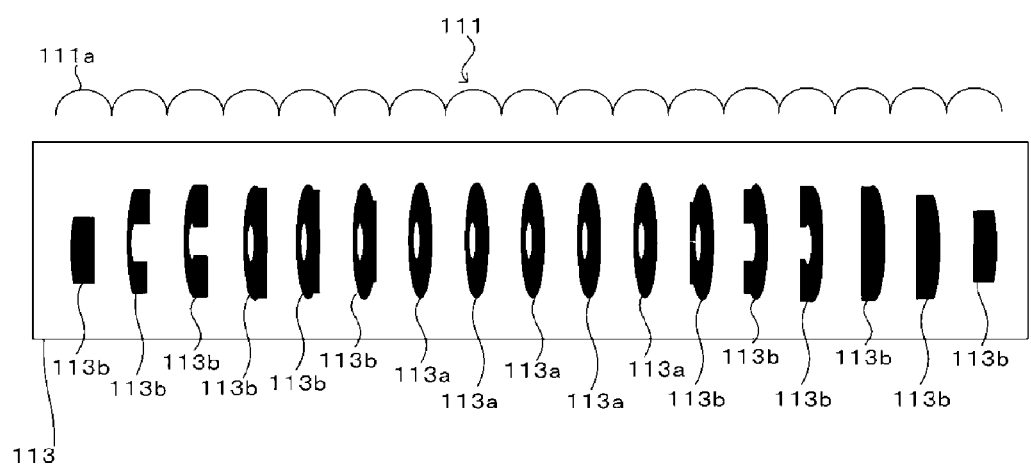
FIG. 19A is an explanatory view for explaining structure of an image display sheet according to a further another embodiment 9.

FIG. 19A is a view explaining a structure of an image display sheet according to the other embodiment 9, which represents correspondence between a lenticular sheet 111 and respective cylindrical lenses 111a and images 113a, 113b. Further, it is to be noted that the structure or arrangement of the lenticular sheet 111 is substantially the same as that of the lenticular sheet 1, so that explanation thereof will be omitted herein.

On the image forming layer 113, a plural number of images 113a and 113b as image groups for observation of virtual images (called group of image for observing virtual image, hereunder) are formed. The group of image for observing virtual image includes groups of the image for observing stand still (stationary) virtual image which constituted by a predetermined number (for example, several tens) of images for observing stand still virtual image. The image 113b as the image for observing stand still virtual image is one constituting a virtual image to become stationary. In an example of FIG. 19A, groups of image for observing stand still virtual image composed of eight images 113b are formed on both end portions of group of image for observing virtual image for the sake of simplified illustration. The images 113*a* and 113*b* are formed in a repeated manner so as to correspond to the cylindrical lenses 1*a* substantially one-on-one.

The image 113*b* will be explained hereunder.

Figure 19B:
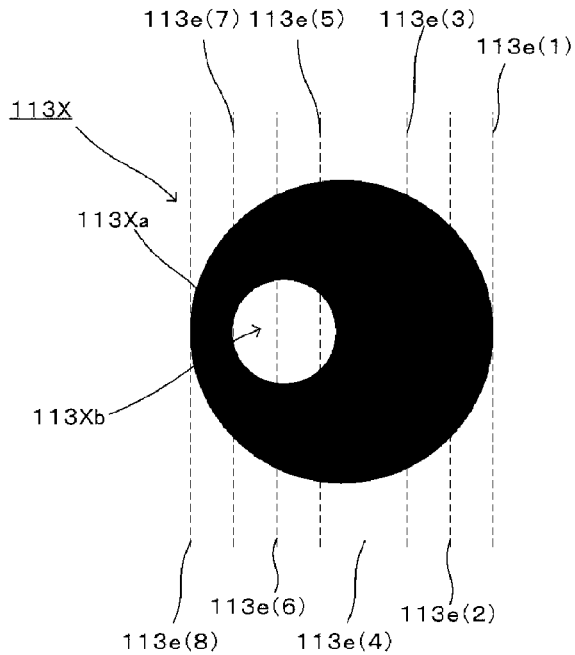
FIG. 19B is a view explaining an original image 113Xa and an original image 113Xb.
Figure 19C:
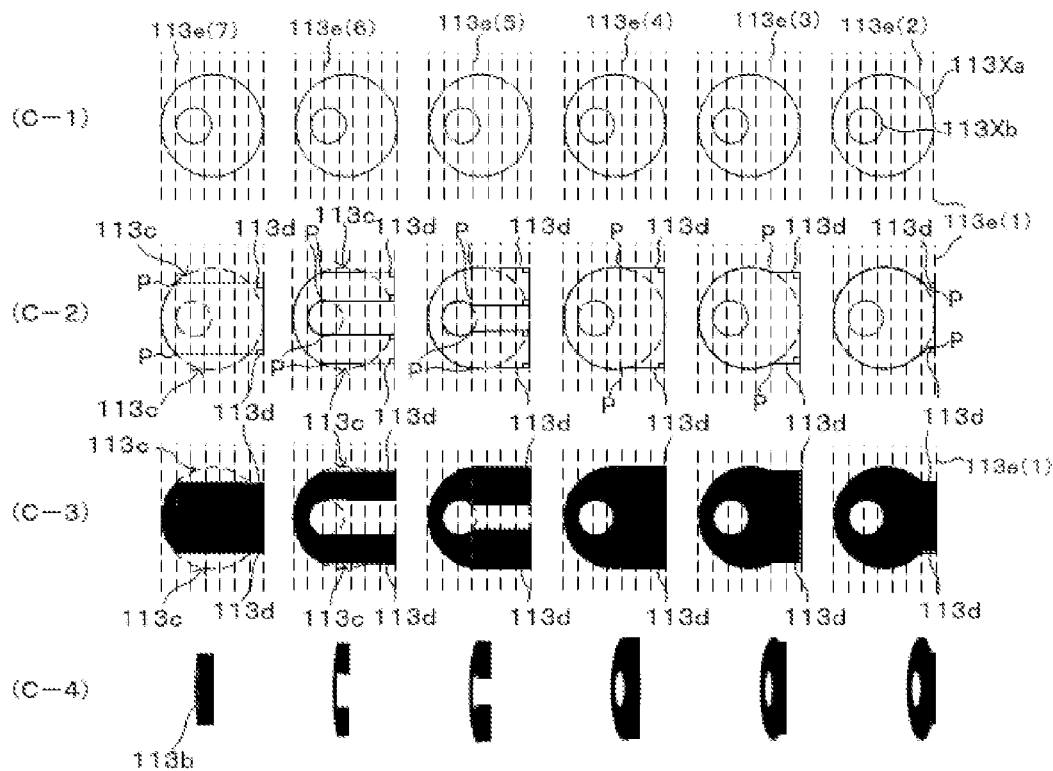
FIG. 19C shows a preparation example of an image group for observing still (stationary) virtual images.
Figure 19D:
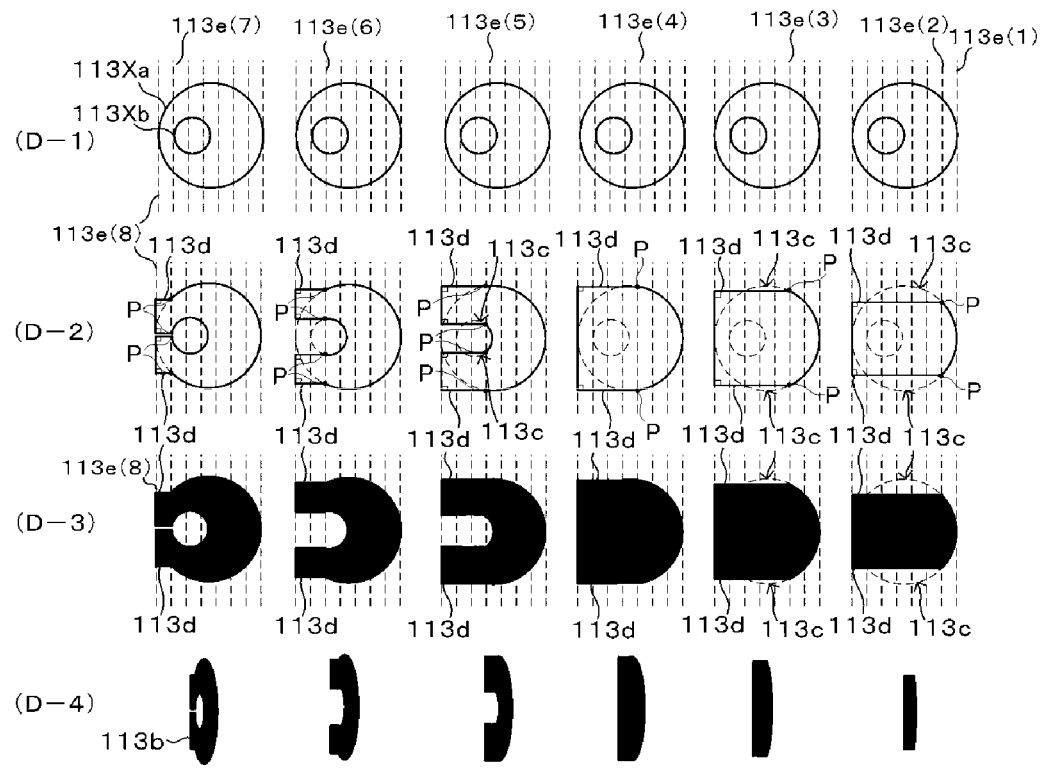
FIG. 19D shows a preparation example of an image group for observing still virtual images.
Figure 19E:
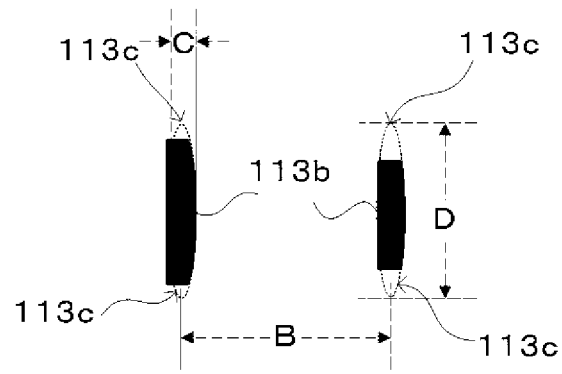
FIG. 19E is an illustration for explaining a pitch length measurement of an image 113b.

FIG. 19B is an explanation view of original images 113Xa and 113Xb. FIGS. 19C and 19D represent examples of preparation of group of image for observing stand still virtual image. Further, the image 113*a*, which is not image for observing stand still virtual image, in the images for observing virtual image formed on the image forming layer 113 has the same or identical structure of the image 3*a* mentioned hereinbefore, and hence, the explanation thereof is omitted herein.

In the example of FIG. 19B, the image 113*b* is composed of two elements of black circle and white circle. The original image 113X of the image 113*b* is composed of an original image 113Xa as an origin of the black circle and an original image 113Xb as an origin of the white circle. The image 113*b* includes a cut-out portion 113*c* and an enlarged portion 113*b* respectively to the original images 113Xa and 113Xb, and then reduced in predetermined sizes.

Definition of a plurality of auxiliary lines to the original image 113X will be explained. For example, definitions of auxiliary lines 113*e* for number of images 113*b* constituting the group of image for observing stand still virtual image and auxiliary lines 113*e* for preparing an enlarged portion 113*d* to the image 113*b* will be made. In the case of FIG. 19A, the group of image for observing stand still virtual image at the left end side of the image forming layer 113 is composed of six images 113*b*, and accordingly, six auxiliary lines 113*e* and two auxiliary lines 113*e* forming the enlarged portion 113*d*, i.e., total eight auxiliary lines (113*e*(1), 113*e*(2), - - - 113*e*(8)) will be defined. The respective auxiliary lines are arranged with equal interval or irregular interval.

Further, the enlarged portion 113*d* forming the image 113*b* is formed on the side of the image 113*a*. Because of this reason, the image 113*b* constituting the group of image for observing stand still virtual image on the left side of the image forming layer 113 forms the enlarged portion 113*d* using the auxiliary line 113*e*(1), and the image 113*b* constituting the group of image for observing stand still virtual image on the right side of the image forming layer 113 forms the enlarged portion 113*d* using the auxiliary line 113*e*(8). Therefore, since the image 113*b* constituting the group of image for observing stand still virtual image on the left side of the image forming layer 113 does not use the auxiliary line 113*e*(8), in the initial stage, only the seven auxiliary lines 113*e*(1) to 113*e*(7) may be defined. Likely, the image 113*b* constituting the group of image for observing stand still virtual image on the right side of the image forming layer 113 does not use the auxiliary line 113*e*(1), only the seven auxiliary lines 113*e*(2) to 113*e*(8) may be defined. For the sake of simple explanation, a case in which eight auxiliary lines are drawn to the original image 113X will be explained regardless of the images 113*b* constituting the left or right group of image for observing stand still virtual image.

Further, herein, an example, in which two auxiliary lines 113*e*(1) and 113*e*(8) forming the enlarged portion 113*d* are made as tangential lines to the original image 113X, will be explained. Further, in the followings, the term auxiliary line 113*e* may be used for explaining any one of auxiliary lines 113*e*(1) to 113*e*(8) or all of them totally.

FIGS. 19C and 19D represent preparation examples of groups of image for observing stand still virtual image, in which FIG. 19C represents a preparation example of the group of image for observing stand still virtual image on the left side of the image forming layer 113 shown in FIG. 19A, and FIG. 19D represents a preparation example of the group of image for observing stand still virtual image on the right side of the image forming layer 113 shown in FIG. 19A. The groups of image for observing stand still virtual image shown in FIGS. 19C and 19D will be explained with reference to examples of cases formed respectively with six images 113*b*. Further, the auxiliary line 113*e* and a later-mentioned intersection point P are for defining the cut-out portion 113*c* and the enlarged portion 113*d*, so that they are not described on the image forming layer 113.

First, refereeing to FIG. 19C, the preparation example of the group of image for observing stand still virtual image on the left side of the image forming layer 113 will be explained. At first, original images 113X of the number corresponding to the number of the images 113*b* constituting the group of image for observing stand still virtual image is prepared. In the example of FIG. 19C, six original images 113X are prepared (C-1). Further, in the examples of (C-1) and (C-2) of FIG. 19C, the original images 113X are illustrated with non-color (white) manner for the sake of clear observation.

The respective original images 113X are deformed based on vertical line described to the auxiliary line 113*e*(1) from the intersection points between the auxiliary lines 113*e*(2) to 113*e*(7) and the original images 113X. In the example of FIG. 19C, as to the respective original images 113X, the respective original images 113X are deformed based on vertical line described to the auxiliary line 113*e*(1) from the intersection points P between the auxiliary lines 113*e*(2) to 113*e*(7) and the original images 113X (C-2). In the example of FIG. 19C, the original images 113X are composed of the original images 113Xa and 113Xb. Accordingly, in the example of the original images 113Xa, the respective original images 113Xa are deformed based on vertical line described to the auxiliary line 113*e*(1) from the intersection point P between the auxiliary lines 113*e*(2) to 113*e*(7) and the original images 113Xa. In the like manner, the respective original images 113Xb are deformed based on vertical line described to the auxiliary line 113*e*(1) from the intersection point P between the auxiliary lines 113*e*(2) to 113*e*(7) and the original images 113Xb.

More specifically, as to the original image 113X, nearest to the image 113*a* in the six original images 113X (most right-side original image 113X in FIG. 19C), a vertical line is drawn to the auxiliary line 113*e*(1) from the two intersection points P of the auxiliary lines 113*e*(2) and the original images 113Xa.

As to the original image 113X, secondarily nearest to the image 113*a* in the six original images 113X, a vertical line is drawn to the auxiliary line 113*e*(1) from the two intersection points P of the auxiliary lines 113*e*(3) and the original images 113Xa.

As to the original image 113X, thirdly nearest to the image 113*a* in the six original images 113X, a vertical line is drawn to the auxiliary line 113*e*(1) from the two intersection points P of the auxiliary lines 113*e*(4) and the original images 113Xa.

As to the original image 113X, fourthly nearest to the image 113*a* in the six original images 113X, a vertical line is drawn to the auxiliary line 113*e*(1) from the two intersection points P of the auxiliary lines 113*e*(5) and the original images 113Xa.

As to the original image 113X, fifthly nearest to the image 113*a* in the six original images 113X, a vertical line is drawn to the auxiliary line 113e(1) from the two intersection points P of the auxiliary lines 113e(6) and the original images 113Xa.

As to the original image 113X, sixthly nearest to the image 113a in the six original images 113X, i.e., the original image on the most left side image 113X in the drawing, a vertical line is drawn to the auxiliary line 113e(1) from the two intersection points P of the auxiliary lines 113e(7) and the original images 113Xa.

As mentioned hereinabove, the original image 113X is deformed based on the auxiliary line 113e(1) and the vertical line. In the example of FIG. 19C (C-3), the original image 113X is deformed based on the auxiliary line 113e(1) and the vertical line. The original image 113X has the enlarged portion 113d on the image 113a side (right side in FIG. 19C). More specifically, the enlarged portion 113d is formed by the auxiliary line 113e(1) and the vertical line.

At least one or more images 113b positioned on the left end side of the group of image for observing virtual image have cutouts 113c formed at both end portions in the vertical direction with respect to the arranging direction of the images 113a and 113b as virtual image observation images. In the example of FIG. 19C (C-3), in the case of the original images 113Xa, when the auxiliary lines 113e(2) to 113e(7) having the intersection points P are positioned on the left side of the central portion (in other words, when they are positioned on the side apart from the image 113a than the central position of the original image 113Xa), the cutouts 113c are formed above and below the original image 113Xa. In the like manner, in the case of the original images 113Xb, when the auxiliary lines 113e(2) to 113e(7) having the intersection points P is positioned on the left side of the central portion (in other words, when they are positioned on the side apart from the image 113b than the central position of the original image 113Xb), the cutouts 113c are formed above and below the original image 113Xb.

Further, the original images 113X after the deformation are downscaled in predetermined size to thereby form the images 113b (C-4). In the example of FIG. 19C (C-4), six images 113b are formed.

Then, refereeing to FIG. 19D, the preparation example of the group of image for observing stand still virtual image on the right side of the image forming layer 113 will be explained. At first, original images 113X of the number corresponding to the number of the images 113b constituting the group of image for observing stand still virtual image are prepared. In the example of FIG. 19D, six original images 113X are prepared (D-1). Further, in the examples of (D-1) and (D-2) of FIG. 19D, the original images 113X are illustrated with non-color (white) manner for the sake of clear observation.

The respective original images 113X are deformed based on vertical line described to the auxiliary line 113e(8) from the intersection points between the auxiliary lines 113e(7) to 113e(2) and the original images 113X. In the example of FIG. 19D, as to the respective original images 113X, the respective original images 113X are deformed based on vertical line described to the auxiliary line 113e(8) from the intersection points P between the auxiliary lines 113e(7) to 113e(2) and the original images 113X (D-2). In the example of FIG. 19D, the original images 113X are composed of the original images 113Xa and 113Xb. Accordingly, the respective original images 113Xa are deformed based on vertical line described to the auxiliary line 113e(8) from the intersection points P between the auxiliary lines 113e(7) to 113e(2) and the original images 113Xa. In the like manner, the respective original images 113Xb are deformed based on vertical line described to the auxiliary line 113e(8) from the intersection points P between the auxiliary lines 113e(7) to 113e(2) and the original images 113Xb.

More specifically, as to the original image 113X, nearest to the image 113a in the six original images 113X (most left-side original image 113X in FIG. 19D), a vertical line is drawn to the auxiliary line 113e(8) from the two intersection points P of the auxiliary lines 113e(7) and the original images 113Xa.

As to the original image 113X, secondarily nearest to the image 113a in the six original images 113X, a vertical line is drawn to the auxiliary line 113e(8) from the two intersection points P of the auxiliary lines 113e(6) and the original images 113Xa.

As to the original image 113X, thirdly nearest to the image 113a in the six original images 113X, a vertical line is drawn to the auxiliary line 113e(8) from the two intersection points P of the auxiliary lines 113e(5) and the original images 113Xa.

As to the original image 113X, fourthly nearest to the image 113a in the six original images 113X, a vertical line is drawn to the auxiliary line 113e(8) from the two intersection points P of the auxiliary lines 113e(4) and the original images 113Xa.

As to the original image 113X, fifthly nearest to the image 113a in the six original images 113X, a vertical line is drawn to the auxiliary line 113e(8) from the two intersection points P of the auxiliary lines 113e(3) and the original images 113Xa.

As to the original image 113X, sixthly nearest to the image 113a in the six original images 113X, i.e., the most right side original image 113X in the drawing, a vertical line is drawn to the auxiliary line 113e(8) from the two intersection points P of the auxiliary lines 113e(2) and the original images 113Xa.

As mentioned hereinabove, the original image 113X is deformed based on the auxiliary line 113e(8) and the vertical line. In the example of FIG. 19D (D-3), the original image 113X is deformed based on the auxiliary line 113e(8) and the vertical line. The original image 113X has the enlarged portion 113d on the image 113a side (left side in FIG. 19D). More specifically, the enlarged portion 113d is formed by the auxiliary line 113e(8) and the vertical line.

At least one or more images 113b positioned on the right end side of the group of image for observing virtual image have cutouts 113c formed at both end portions in the vertical direction with respect to the arranging direction of the images 113a and 113b as virtual image observation images. In the example of FIG. 19D (D-3), in the case of the original images 113Xa, when the auxiliary lines 113e(7) to 113e(2) having the intersection points P is positioned on the right side of the central portion (in other words, when they are positioned on the side apart from the image 113a than the central position of the original image 113Xa), the cutouts 113c are formed above and below the original image 113Xa. In the like manner, in the case of the original images 113Xb, when the auxiliary lines 113e(7) to 113e(2) having the intersection points P are positioned on the right side of the central portion (in other words, when they are positioned on the side apart from the image 113a than the central position of the original image 113Xa), the cutouts 113c are formed above and below the original image 113Xb.

Further, the original images 113X after the deformation are downscaled in predetermined size to thereby form the images 113b (D-4). In the example of FIG. 19D (D-4), six images 113b are formed.

The group of image for observing stand still virtual image are formed on the image forming layer 113 by the images 113b formed by the manner mentioned above (FIG. 19A).

The images 113a and 113b are formed so as to correspond, one-on-one, to the cylindrical lenses 111a as like as in the embodiments described hereinbefore. It is constructed such that the arrangement pitch length A of the cylindrical lenses 111a differs from the difference between the pitch lengths B of the images 113a and 113b, and in addition, the difference between the arrangement pitch length A of the cylindrical lenses 111a and the pitch length B of the images 113a is difference is not more than 10% with respect to the arrangement pitch length A of the cylindrical lenses 111a or pitch lengths B of the image 113a and 113b. Further, the pitch length B between the image 113a and the image 113b, and the pitch length B between the images 113b are supposed to the pitch length B in a case of no formation of cutout 113c and enlarged portion 113d to the image 113b. Moreover, the widths C and D are supposed to the widths C and D in a case of no cutout 113c to the image 113b.

Further, the image forming layer 113 may be formed to an image forming medium, not shown, and also, as in another embodiment 2, may be formed directly to the lenticular sheet 111. In the case when the image forming layer 113 is formed on the image forming medium, the image forming medium has a structure or configuration identical to the image forming medium 2 described hereinbefore.

As described hereinabove, since the image display sheet is formed so as to have the group of image for observing stand still virtual image composed of a predetermined number of the images 113b formed on the end portion of the group of image for observing virtual image and also have the enlarged portion to the image 113b, it becomes possible to stop (take stationary position) the virtual image 114 smoothly moving along the movement of the line of sight of an observer to the predetermined position.

Figure 20:
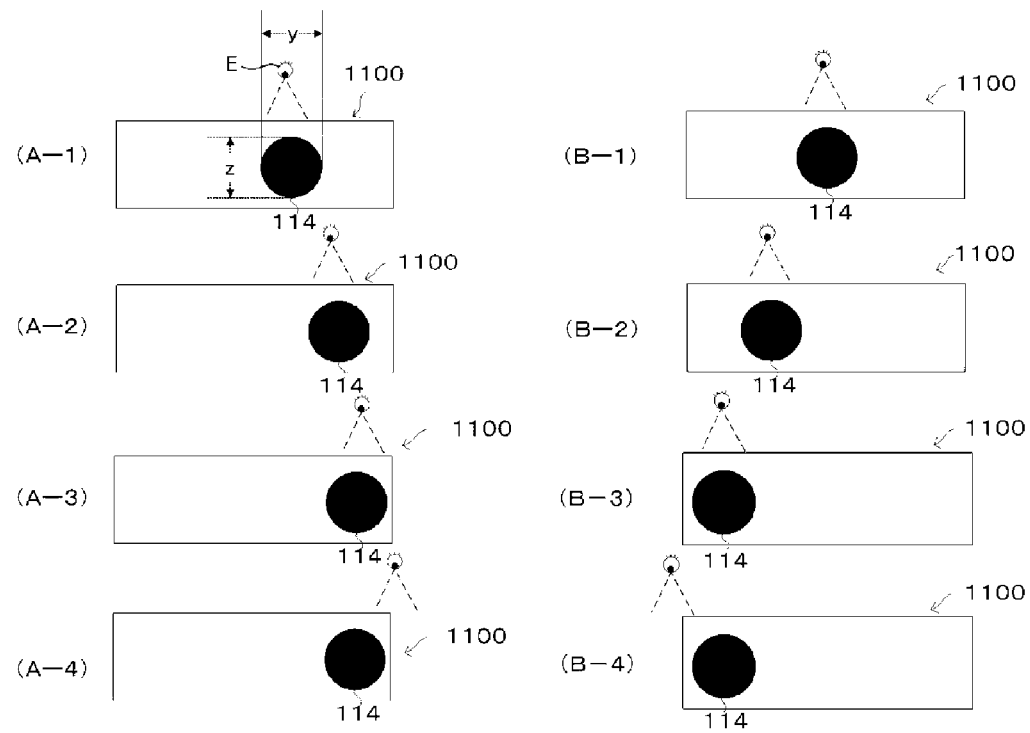
FIG. 20 is an explanatory view for explaining structure of a virtual image according to a further another embodiment 9.

FIG. 20 is a view for explaining a configuration of a virtual image, in which (A-1)~(A-4) shows movement of the virtual image when the line of sight is moved rightward on the image display sheet 1100. When the line of sight is moved rightward, the virtual image moves further rightward ((A-1)→(A-2)), and even if the line of sight is further moved rightward, the virtual image stops without further moving ((A-3) and (A-4)). (B-1)~(B-4) shows movement of the virtual image when the line of sight is moved leftward on the image display sheet 1100. When the line of sight is moved leftward, the virtual image moves further rightward ((B-1)→(B-2)), and even if the line of sight is further moved leftward, the virtual image stops without further moving ((B-3) and (B-4)).

As described above, by constituting the group of image for observing stand still virtual image composed of the images 113b, an image display sheet capable of observing a stand still (stationary) virtual image can be realized.

Figure 21:
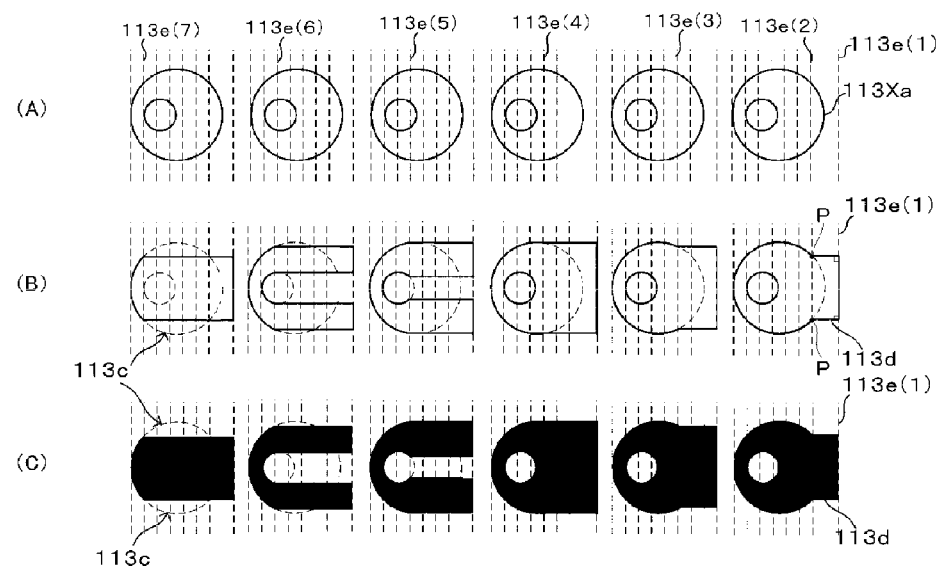
FIG. 21 is an explanatory view of application example according to the further another embodiment 9.

Further, in the above-described embodiment, although there is explained an example in which the auxiliary line 113e(1) (FIG. 19C) and the auxiliary line 113e(8) (FIG. 19D) forming the enlarged portion 113d are tangential lines to the original image 113X, the present invention is not limited to such example. FIG. 21 is a view for explaining an application of the other embodiment 9. In an example shown in FIG. 21, the auxiliary line 113e(1) is defined at a position apart from the original image 113X, and the original image 113X is deformed based on the vertical line drawn to the auxiliary line 113e(1) from the intersection point between the auxiliary lines 113e(2) to 113e(7) and the original image 113X. As explained above, by defining the auxiliary line 113e(1) at the position apart from the original image 113X, further larger enlarged portion 113d may be formed.

In the example shown in FIG. 19C, when the line of sight of an observer is moved leftward on the image display sheet 1100, the still virtual image stops (i.e., is stationary). If the line of sight is further moved leftward after the stopping of the virtual image, the stopped virtual image becomes invisible. However, with reference to an example of FIG. 21, since the image 113b has the larger enlarged portion 113d, even if the line of sight is continuously moved after the stopping of the virtual image, a virtual image can be observed for a time longer than the case of the image 113b shown in FIG. 19C.

Furthermore, in the embodiment described above, although there is explained an example in which the image 113b having the cutout 113c and the enlarged portion 113b are formed by using the auxiliary lines 113e, the present invention is not limited to such example. In order for realizing the still (stationary) virtual image, the image 113b as an image for observing stand still virtual image may be constituted so as to have at least the cutout 113c and the enlarged portion 113d.

Furthermore, in the embodiment described above, although there is adopted the structure having the groups of image for observing stand still virtual image composed of a predetermined number of images 113b formed at both end portions of the group of image for observing virtual image, there may adopt a structure in which the group of image for observing stand still virtual image composed of the images 113a is formed only one end portion thereof. For example, if a structure having the group of image for observing stand still virtual image formed on the left side of the image 113a in FIG. 19A is for example taken, there may also be adopted a structure in which when the line of sight is moved rightward on the image display sheet 1100, the virtual image 114 is continuously moved without being stopped, and when the line of sight is moved leftward, the virtual image is moved leftward, and thereafter, stops.

Still furthermore, in the embodiment described above, although there is adopted the structure having the images 113a as the images for observing virtual image which are not the images for observing stand still virtual image to the image forming layer 113Xa, the present invention may be realized even in the case of no images 113a.

Still furthermore, in the embodiment described above, although the explanation is made to the manner or means in which the original images 113Xa and 113Xb are reduced in the predetermined sizes after the formation of the cutouts 113c and the enlarged portions 113d, the present invention is not limited to such example, and after the original images 113Xa and 113Xb are reduced in the predetermined sizes, the cutouts 113c and the enlarged portions 113d may be formed.

Still furthermore, in the embodiment described above, although the original images 113X are used as a manner or means for forming the cutouts 113c and the enlarged portions 113d, the present invention is not limited to such example, and other formation means may be adopted as far as the cutout 113c and the enlarged portion 113d can be formed to the image 113b.

(Other Embodiment 10)

An image display sheet according to the other embodiment 10 is an image display sheet in which the arrangement pitch length A of the cylindrical lenses and the pitch length B of the image is equal (A=B). In addition, there is explained an image display body formed by bending the image display sheet into circular-arc shape or cylindrical shape. It is further to be noted that descriptions as to structures like or similar to those mentioned hereinbefore will be omitted herein.

Figure 22:
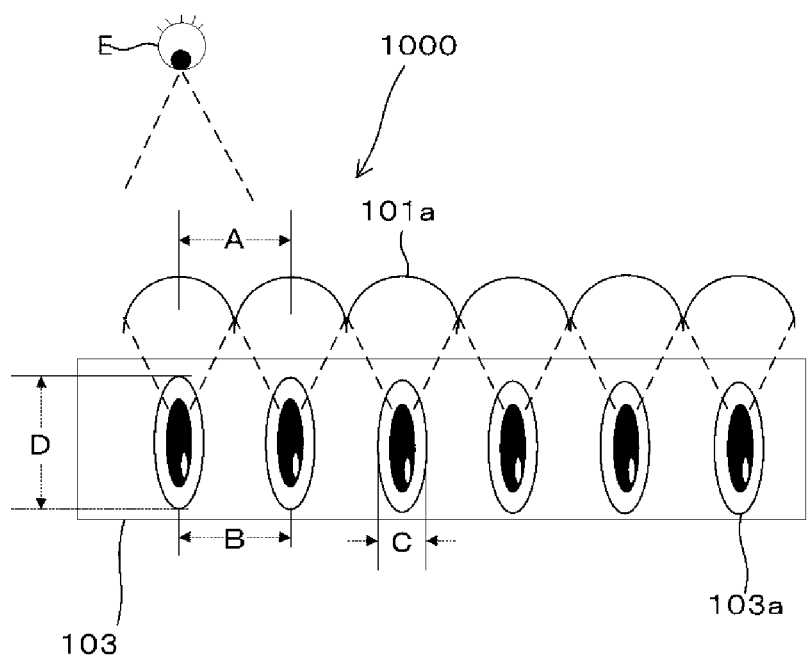
FIG. 22 is an explanatory view for explaining structure of an image display sheet according to a further another embodiment 10.
Figure 23A:
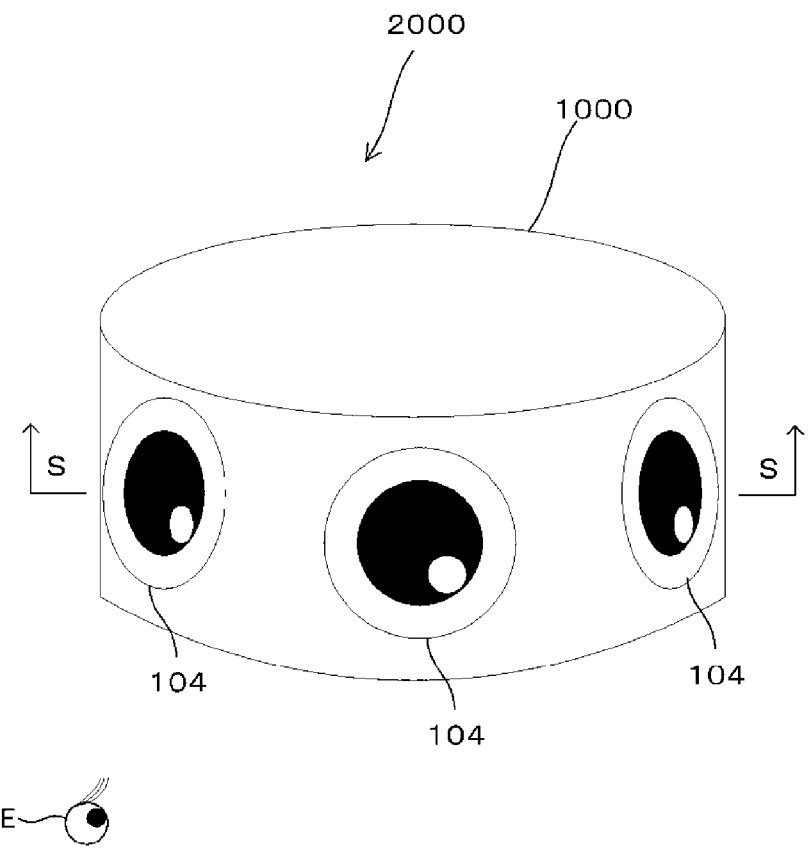
FIG. 23A is an illustration showing an outer appearance of an image display body 2000 according to an image display sheet 1000.
Figure 23B:
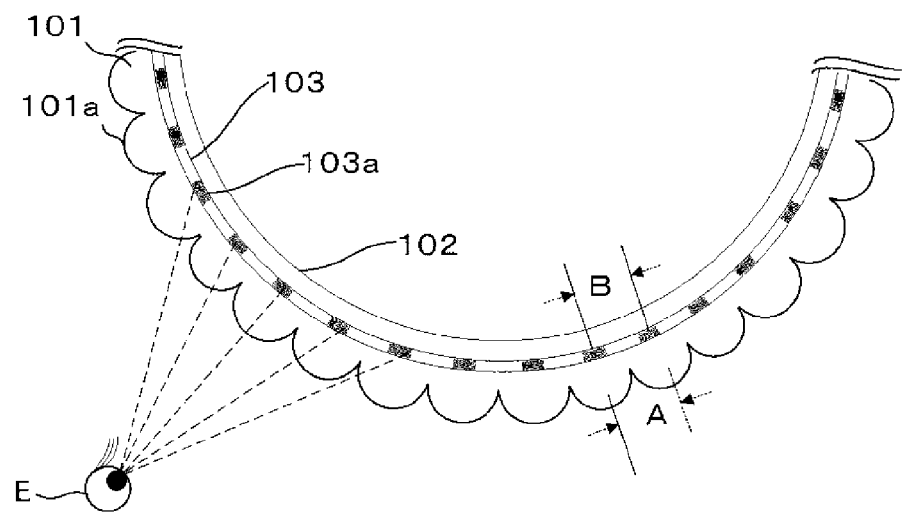
FIG. 23B is a sectional view of an essential portion of the image display body 2000.

FIG. 22 is a view for explaining a structure of the image display sheet according to the other embodiment 10. FIG. 23(A) is a view for explaining outer appearance of an image display body 2000 based on the image display sheet 1000, and FIG. 23(B) is a sectional view showing an essential portion of the image display body 2000.

FIG. 22 is a view for explaining correspondence between cylindrical lenses and images 103a, respectively, of the image display sheet 1000 according to the other embodiment 10.

The image forming medium 102 is arranged on a side of the lenticular sheet 101 on which the cylindrical lenses 101a have no convex shape, and the image forming layer 103 is formed on the side of the lenticular sheet 101. The image forming layer 103 is a layer in which picture pattern, letter or like as an image for observing a virtual image (called hereafter as an image for observing virtual image) is formed by printing or transferring means. The other structures of the lenticular lenses 101 are the same as those of the lenticular lenses 1 mentioned hereinbefore, so that the explanation thereof is now omitted herein. In addition, since the other structures of the image forming medium 102 are the same as those of the image forming medium 2 mentioned hereinbefore and the other structures of the image forming layer 103 are the same as those of the image forming layer 3 mentioned hereinbefore, the explanations thereof are now omitted herein.

As shown in FIG. 22, the image forming layer 103 is formed with a plurality of images 103a. In an example shown in FIG. 22, the images 103a are formed in a repeated manner so as to correspond one-on-one to the cylindrical lenses 101a. More specifically, six images 103a are arranged to the focal points of six cylindrical lenses 101a, respectively. The arrangement pitch length A of the cylindrical lenses 101a and the pitch length B of the images 103a are formed to be equal to each other (A=B). As shown in FIG. 22, the arrangement pitch length A of the cylindrical lenses 101a and the pitch length B of the images 103a are formed to be equal with difference between the pitches A and B being zero (0%), and such image forming layer 103 is bent, thereby realizing an image display body by which a virtual image can be most clearly observed directly from the line of sight of an observer. The direct observation in the line of sight direction means the observation in which the virtual image is observed from a position at which an incident angle is zero with respect to the image display sheet forming the image display body. The image display body will be described hereunder.

In a case of an image display sheet 1000 having flexibility, it may be possible to constitute the image display body 2000 as shown in FIG. 23(A) in a manner such that the image display sheet 1000 is formed into a cylindrical shape with the lenticular sheet side being located outside. The images 103a are formed so as to correspond to the cylindrical lenses 101a one-on-one in a state in which the image display sheet is bent as shown in FIG. 23(B). In other words, in the bent state of the image display sheet 1000, the arrangement pitch length A of the cylindrical lenses 101a and the pitch length B of the images 103a are equal to each other (A=B).

In the state in which the image display body 2000 is constituted by bending the image display sheet 1000 (FIGS. 23(A) and 23(B)), if there is adopted a configuration in which the arrangement pitch length A of the cylindrical lenses 101a and the pitch length B of the images 103a are equal to each other (A=B), there can be realized the image display body 2000 in which the virtual image 104 by the cylindrical lenses 101a and the image 103a can be observed at the front even if being observed from every direction. According to the movement of the line of sight, the virtual image 104 can be moved always at the front.

In other words, for an observer, the virtual image 104 will be observed such that it always stops at the front. This is because the movement of the virtual image 104 in accordance with the movement of the line of sight is smoothly performed. In the case of the image 103a being an eye image, there can create a state in which the eye of the virtual image 104 always accords with the line of sight of the observer.

Further, although the image display body 2000 is constituted in a manner such that the image display sheet 1000 is formed into a cylindrical shape with the lenticular sheet (101) side facing outside, it may be possible to constitute the image display body 2000 in a manner such that the image display sheet 1000 is formed into a cylindrical shape with the lenticular sheet (101) side facing inside.

Figure 24A:
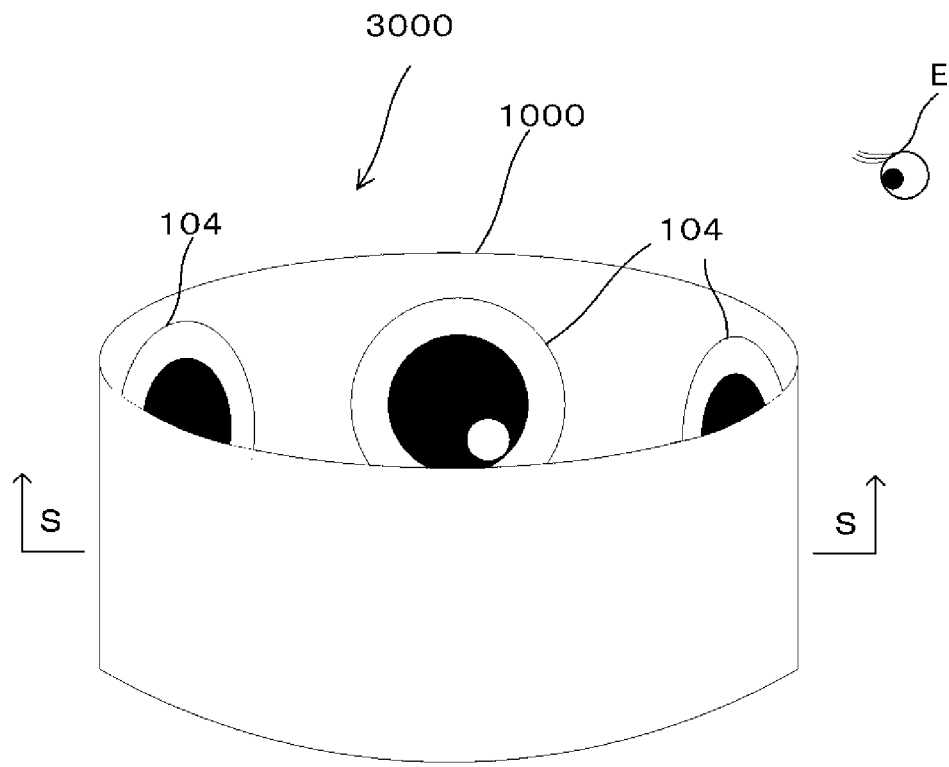
FIG. 24A is an illustration showing an outer appearance of an image display body 3000 of the image display sheet 1000.
Figure 24B:
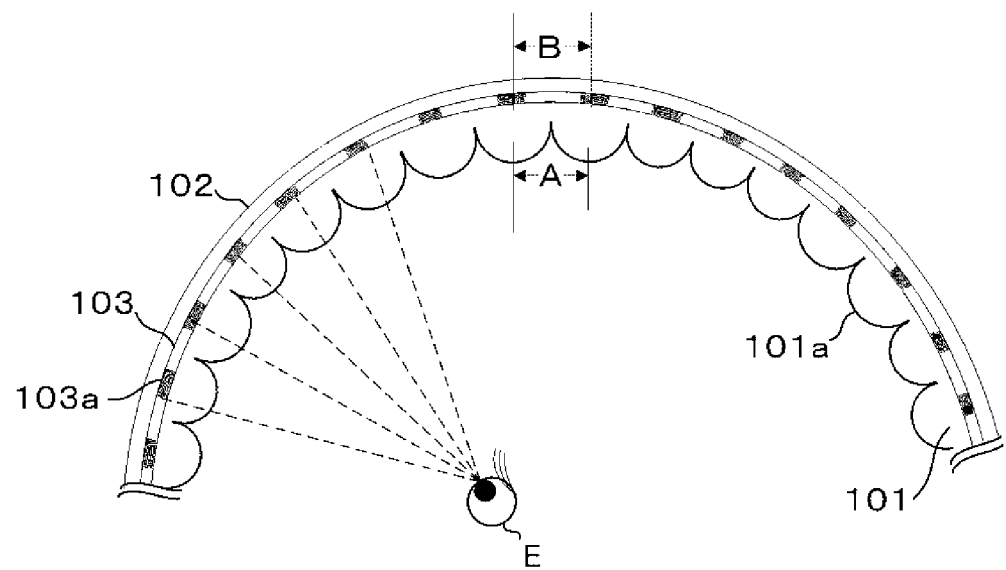
FIG. 24B is a sectional view of an essential portion of the image display body 3000.

FIG. 24 represents an example of an image display body 3000 constituted in a manner such that the image display sheet 1000 is formed into a cylindrical shape with the lenticular sheet (101) side being located inside. FIG. 24(A) is a view explaining an outer appearance of the image display body 3000 formed from the image display sheet 1000, and FIG. 24(B) is a sectional view of an essential portion of the image display body 3000. Under the state in which the image display body 3000 is formed by bending the image display sheet 1000 into a cylindrical shape, the arrangement pitch length A of the cylindrical lenses 101a and the pitch length B of the images 103 is equal to each other (A=B).

With the image display body 3000, the virtual image 104 by the cylindrical lenses 101a and the images 103a can be observed always at the front even being viewed from every circumferential direction (360 degrees). That is, since the virtual image 104 is moved smoothly in front of an observer in accordance with the movement of the line of sight of the observer, the virtual image 104 can be seen as if it stops always at the front for the observer.

Figure 25:
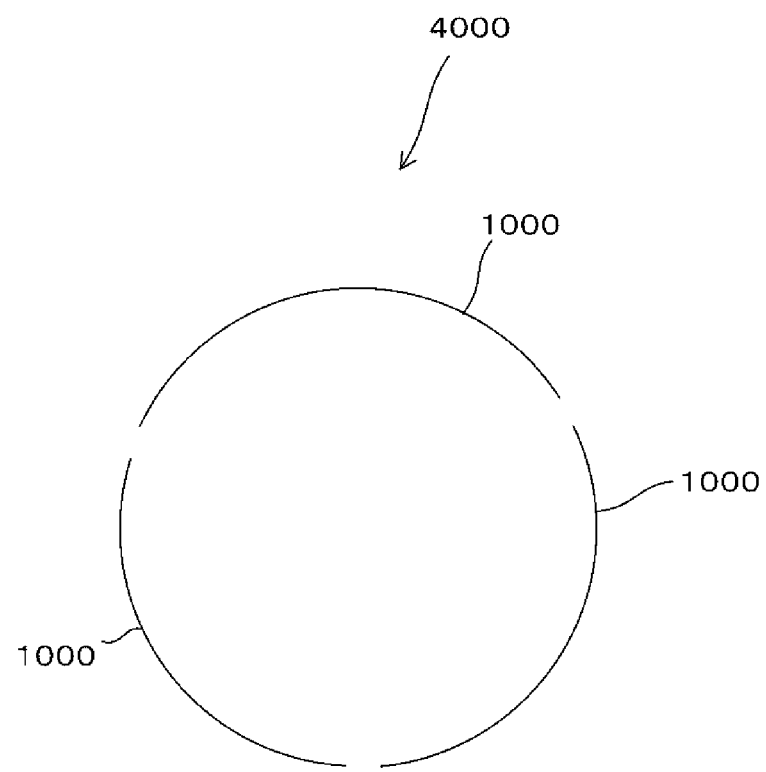
FIG. 25 is an illustration showing an outer appearance of an image display body 4000 of the image display sheet 1000.
Figure 26A:
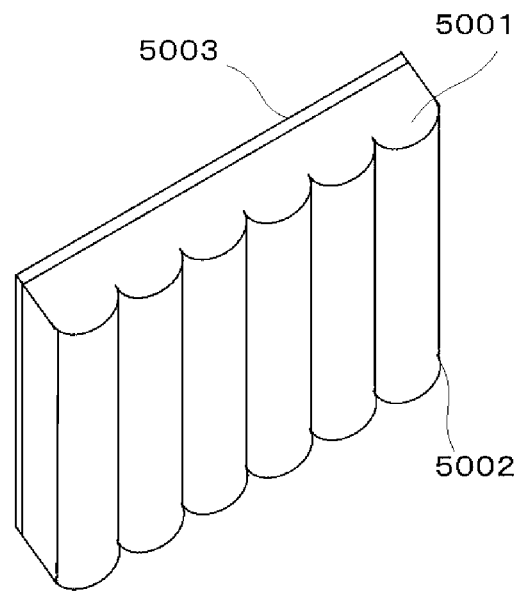
FIG. 26A is a view explaining a basic characteristic feature of a lenticular.
Figure 26B:
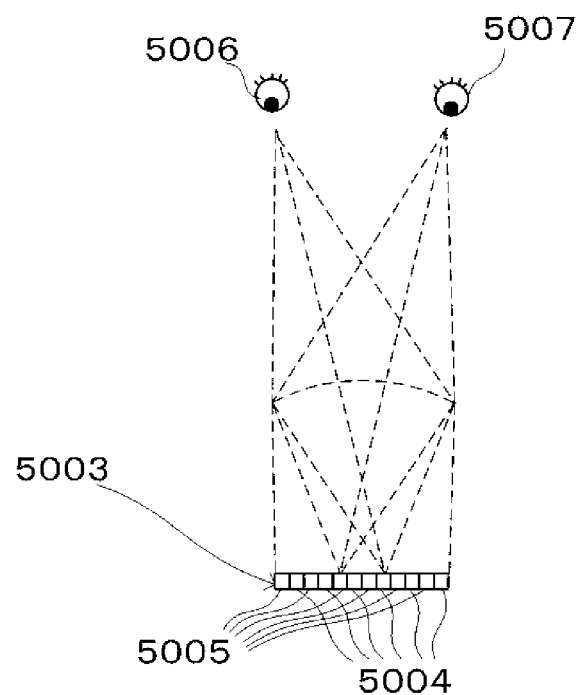
FIG. 26B is a schematic explanatory view for explaining a basic principle of the lenticular.
Figure 27:
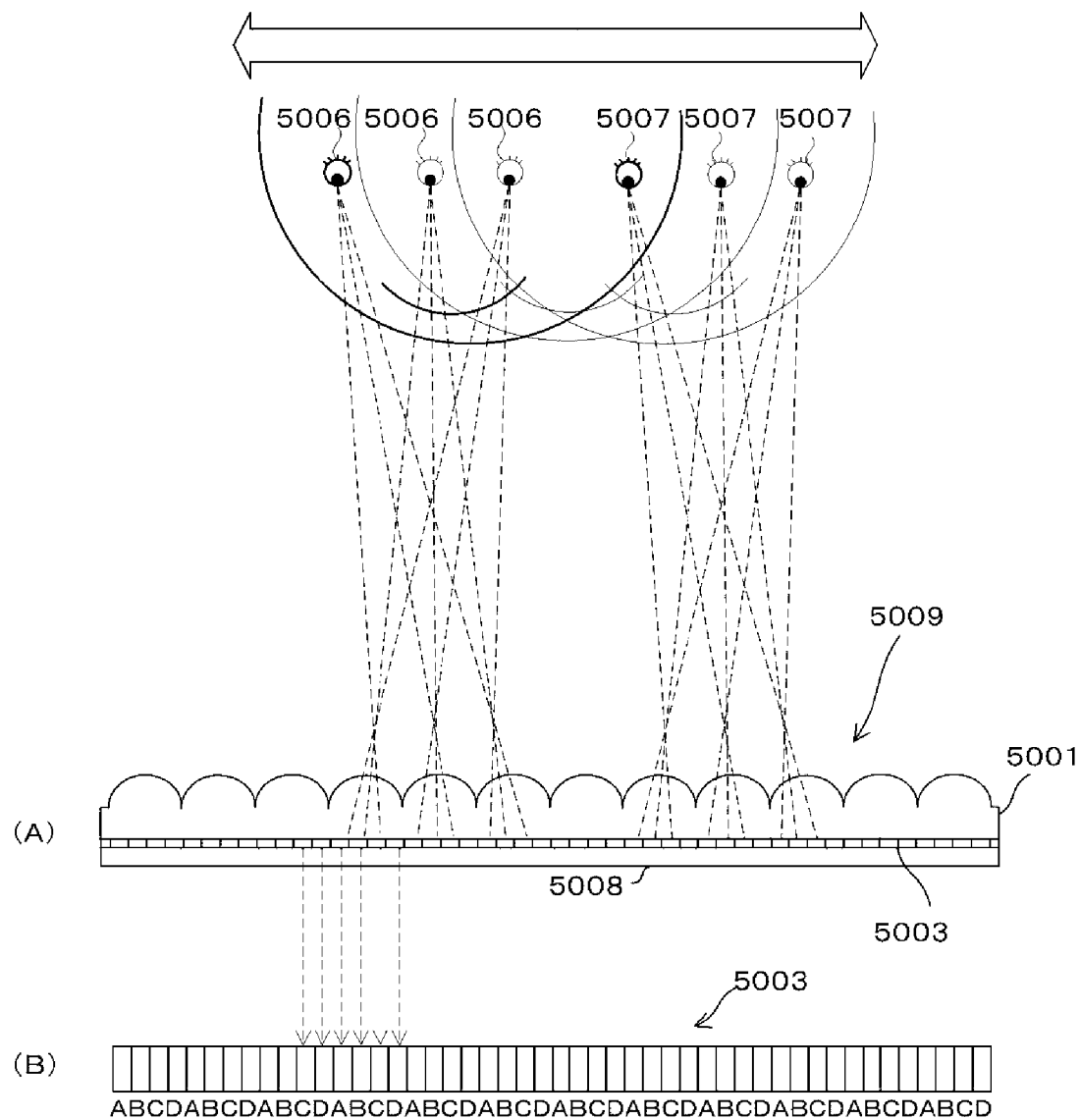
FIG. 27 is a view explaining an image display layer forming a conventionally known image display sheet.

Further, although the image display bodies 2000 and 3000 are constituted by bending the image display sheet 1000 so as to provide a cylindrical shape, the image display body may be formed by forming the image display sheet 1000 into partially or entirely circular-arc shape or cylindrical shape. Furthermore, an image display body 4000 may be composed of a plurality of image display sheets 1000. An example shown in FIG. 25 is one in which three image display sheets 1000 formed in the circular-arc shape to provide a circular image display body 4000.

In addition, the image display sheet 1000 may be formed so as to provide a circular-arc or cylindrical shape by bending an image display sheet having high flexibility. Otherwise, by using an image forming medium provided with a lenticular sheet preliminarily molded into a circular-arc shape and an image forming layer preliminarily molded into a circular-arc shape, a circular-arc shaped image display sheet may be formed by combining them.

It may be further noted that the respective embodiments mentioned hereinabove with reference to FIGS. 1 to 25 may be provided in combination thereof, and moreover, in the respective embodiments, although the lenticular sheet or the flat convex lens sheet and the image forming medium formed with the image forming layer are constituted in contact with each other, the present invention is not limited to such embodiments, and the lenticular sheet or the flat convex lens sheet and the image forming medium formed with the image forming layer may be constituted apart from each other by a predetermined distance. Furthermore, it may be possible to adopt a structure in which an optional medium which does not obstacles a predetermined pseudo moving image appearance may be interposed between the lenticular sheet or the flat convex lens sheet and the image forming medium formed with the image forming layer.

It is to be noted that the application or applicable ranges of the present invention are not limited to the above-described embodiments or modes. The present invention can be widely utilized with respect to the image display sheet and the image display body representing the pseudo moving image. For example, wrapping papers, posters, pamphlets, packages, figures, toys, general goods, machineries, or advertised panels, guidance display plates, digital signage or like which are displayed in both indoor or outdoor may be applied to the image display sheets and image display bodies of the present invention.

REFERENCE NUMERAL 100, 200, 300, 400, 500, 600, 700, 800, 900, 1000, 1100,—image display sheet
   1, 5, 8, 10, 61, 71, 81, 91, 101, 111—lenticular sheet
   1a, 5a, 8a, 10a, 61a, 71a, 81a, 91a, 101a, 111a—cylindrical lens
   2, 8, 11, 16, 62, 72, 82, 92, 102—image forming medium
   3, 6, 9, 12, 13, 17, 19, 20, 21, 63, 73, 83, 93, 103—image forming layer
   3a, 6a, 6b, 12a, 17a, 19a, 19b, 20a, 21b, 63a, 73a, 83a, 93a, 103a, 113a—image (image for observing virtual image)
   113b—image (image for observing virtual image, image for observing stand still virtual image)
      13a, 13b—image (other image)
      6c, 19c, 113c—cutout
   113d—enlarged portion
   4, 7, 18, 114—virtual image
   15—flat convex lens sheet
   15a—flat convex lens
   74, 74—flat convex lens (other convex lens)
   84, 94—meniscus lens (other convex lens)
   2000, 3000—image forming body

The invention claimed is:

1. An image display sheet, which is constituted by laminating a lenticular sheet composed of arrangement of a plurality of cylindrical lenses and an image forming layer, and in which an image formed on the image forming layer from a convex shape side of the cylindrical lenses of the lenticular sheet is formed to be observable as virtual image provided with movement, or movement and deformation, wherein:
   a plurality of images for observing virtual images for displaying the virtual image in association with the cylindrical lenses are formed repeatedly on the image forming layer so as to correspond to the cylindrical lenses respectively one-on-one,
   the size of the image for observing the virtual image in the arrangement direction of the cylindrical lens and the image for observing the virtual image is the size obtained by reducing the size of the virtual image along the arrangement direction,
   the size of the image for observing the virtual image in the vertical direction to the arrangement direction is the same size as the virtual image in the vertical direction to the arrangement direction, and
   a difference between an arrangement pitch length of the cylindrical lenses and a pitch length of the image for observing virtual image formed repeatedly on the image forming layer is in a range of not more than 10% with respect to the arrangement pitch length of the cylindrical lenses or the pitch length of the image for observing virtual image.

2. The image display sheet according to claim 1, wherein:
   the plurality of images for observing virtual image are composed of groups of images for observing virtual image each group including a predetermined number of images for observing virtual image,
   each of other images for observing virtual image excluding image for observing virtual image located near a central portion of the group of images for observing virtual image is provided with a cutout on the side of the group of images for observing virtual image near the central portion of the group of images for observing virtual image, and
   sizes of cutouts increase as being apart in a distance from the image for observing virtual image near the central portion of the group of images for observing virtual image.

3. The image display sheet according to claim 1, wherein:
   the plurality of images for observing virtual image are composed of groups of images for observing stand still virtual image each group including a predetermined number of images for observing stand still virtual image at an end portion of the group of images for observing virtual image,
   the image for observing stand still virtual image is provided with an enlarged portion, and
   at least one or more of the images for observing stand still virtual image, located on the end portion side of the group of images for observing virtual image, among the images for observing stand still virtual image are provided with cutouts at both end portions in a vertical direction with respect to a direction along which the images for observing virtual image are arranged side by side.

4. The image display sheet according to claim 1, wherein:
   the plurality of images for observing virtual image are composed of groups of images for observing stand still virtual image each group including a predetermined number of images for observing stand still virtual image at an end portion of the group of images for observing virtual image,
   the image for observing stand still virtual image is provided with an enlarged portion on the side of the image for observing virtual image which is not the image for observing stand still virtual image, and
   at least one or more of the images for observing stand still virtual image, located on the end portion side of the group of images for observing virtual image, among the images for observing stand still virtual image are provided with cutouts at both end portions in a vertical direction with respect to a direction along which the images for observing stand image are arranged side by side.

5. The image display sheet according to claim 1, wherein the virtual image is constituted to be observable as a stereoscopic virtual image in a manner of going up above the lenticular sheet, or going down below the lenticular sheet.

6. The image display sheet according to claim 1, wherein one or a plurality of the other images, being the other images different from the images for observing virtual image, two-dimensional images or stereoscopic images displaying images to be observed in association with the cylindrical lenses, changing images, or animation images, or images in combination thereof, are formed on the image forming layer, and comprising: one or a plurality of virtual image display portions displaying the virtual image based on the cylindrical lenses, and the image for observing virtual image; one or a plurality of image display portions to be observed displaying the images to be observed based on the two-dimensional images, the cylindrical lenses, and the other images.

7. The image display sheet according to claim 1, wherein the image forming layer is formed on a surface opposite to a surface having the convex shape of the cylindrical lenses of the lenticular sheet.

8. The image display sheet according to claim 1, wherein an image forming medium having the image forming layer is provided, and a surface opposite to a surface having the convex shape of the cylindrical lenses of the lenticular sheet, and a surface opposite to a surface having a convex shape of the cylindrical lenses of the lenticular sheet, and a surface having the image forming layer of the image forming medium are laminated.

9. The image display sheet according to claim 1, wherein other convex lenses are provided on the convex shape side of the cylindrical lenses of the lenticular sheet, and there is adopted a configuration in which focal point accords with the image for observing virtual image through the other convex lenses, and the cylindrical lenses.

10. An image display body wherein the image display sheet according to claim 1 is partially or entirely formed; and
the image display sheet is formed in a state such that the convex shape side of the cylindrical lenses of the lenticular sheet of the image display sheet is bent so as to provide the circular-arc shape or cylindrical shape, with the convex shape side of the cylindrical lenses of the lenticular sheet facing outside or inside of the circular-arc shape or cylindrical shape, and in this state, an arrangement pitch length of the cylindrical lenses and a pitch length of the image for observing virtual image are equal.

11. An image display body wherein the image display sheet according to claim 1 is molded so as to provide a circular-arc shape in which the convex shaped side of the cylindrical lenses of the lenticular sheet faces outside or inside of the circular-arc shape, and the image display body is composed of in combination of a plurality of the image display sheets,
the image display sheet is molded so as to provide a circular-arc shape in a state that an arrangement pitch length of the cylindrical lenses and a pitch length of the image for observing virtual image are equal.

12. An image display sheet, which is constituted by laminating a flat convex lens sheet composed of arrangement of a plurality of flat convex lenses and an image forming layer, and in which an image formed on the image forming layer from a convex shape side of the flat convex lenses of the flat convex lens sheet is formed to be observable as virtual image provided with movement, or movement and deformation, wherein;
a plurality of images for observing virtual images for displaying the virtual image in association with the flat convex lenses are formed repeatedly on the image forming layer so as to correspond to the flat convex lenses respectively one-on-one, and,
a difference between an arrangement pitch length in a horizontal direction of the flat convex lenses and a pitch length in a horizontal directional of the image for observing virtual image formed repeatedly on the image forming layer is in a range of not more than 10% with respect to the arrangement pitch length in the horizontal direction of the flat convex lenses or the pitch length in the horizontal direction of the image for observing virtual image, and,
a difference between an arrangement pitch length in a vertical directional of the flat convex lenses and a pitch length in a vertical direction of the image for observing virtual-image formed repeatedly on the image forming layer is in a range of not more than 10% with respect to the arrangement pitch length in the vertical direction of the flat convex lenses or the pitch length in the vertical direction of the image for observing virtual image,
the plurality of images for observing virtual image are composed of groups of images for observing virtual image each group including a predetermined number of images for observing virtual image,
each of other images for observing virtual image excluding image for observing virtual image located near a central portion of the group of images for observing virtual image is provided with a cutout on the side of the group of images for observing virtual image near the central portion of the group of images for observing virtual image, and
sizes of cutouts increase as being apart in a distance from the image for observing virtual image near the central portion of the group of images for observing virtual image.

13. The image display sheet according to claim 12, wherein the virtual image is constituted to be observable as a stereoscopic virtual image in a manner of going up above or the flat convex lens sheet, or going down below the flat convex lens sheet.

14. The image display sheet according to claim 12, wherein one or a plurality of the other images, being the other images different from the images for observing virtual image, two-dimensional images or stereoscopic images displaying images to be observed in association with the flat convex lenses, changing images, or animation images, or images in combination thereof, are formed on the image forming layer, and comprising: one or a plurality of virtual image display portions displaying the virtual image based on flat convex lenses, and the image for observing virtual image; one or a plurality of image display portions to be observed displaying the images to be observed based on the two-dimensional images the flat convex lenses, and the other images.

15. The image display sheet according to claim 12, wherein the image forming layer is formed on a surface opposite to a surface having a convex shape of the flat convex lenses of the flat convex lens sheet.

16. The image display sheet according to claim 12, wherein an image forming medium having the image forming layer is provided, and a surface opposite to a surface having a convex shape of the flat convex lenses of the flat convex lens sheet and a surface having the image forming layer of the image forming medium are laminated.

17. An image display sheet according to claim 12, wherein other convex lenses are provided on the convex shape side of the flat convex lenses of the flat convex lens sheet, and there is adopted a configuration in which focal point accords with the image for observing virtual image through the other convex lenses, and the flat convex lenses.

18. An image display body wherein the image display sheet according to claim 12 is partially or entirely formed and
the image display sheet is formed in a state such that the convex shape side of the flat convex lenses of the flat convex lens sheet of the image display sheet is bent so as the provide the circular shape-arc shape or cylindrical shape, with the convex shape side of the flat convex lenses of the flat convex lens sheet facing outside or inside of the circular-arc shape or cylindrical shape, and in this state, an arrangement pitch length in the horizontal direction of the flat convex lenses and a pitch length in the horizontal direction of the image for observing virtual image ore equal, and an arrangement pitch length in a vertical direction of the flat convex lenses and a pitch length in a virtual direction of the image for observing virtual image are equal.

19. An image display body wherein the image display sheet according to claim 12 is molded so as to provide a circular-arc shape in which the convex-shaped side of the flat convex lenses of the flat convex lens sheet faces outside or inside of the circular-arc shape, and the image display body is composed in combination of a plurality of the image display sheets, the image display sheet is molded so as to provide a circular-arc shape in a state that an arrangement pitch length in the horizontal direction of the flat convex lenses and a pitch length in the horizontal direction of the image for observing virtual image are equal, and an arrangement pitch length in a vertical direction of the flat convex lenses and a pitch length in a vertical direction of the image foe observing virtual image are equal.

20. An image display sheet, which is constituted by laminating a flat convex lens sheet composed of arrangement of a plurality of flat convex lenses and an image forming layer, and in which an image formed on the image forming layer from a convex shape side of the flat convex lenses of the flat convex lens sheet is formed to be observable as virtual image provided with movement, or movement and deformation, wherein;

a plurality of images for observing virtual images for displaying the virtual image in association with the flat convex lenses are formed repeatedly on the image forming layer so as to correspond to the flat convex lenses respectively one-on-one, and, a difference between an arrangement pitch length in a horizontal direction of the flat convex lenses and a pitch length in a horizontal directional of the image for observing virtual image formed repeatedly on the image forming layer is in a range of not more than 10% with respect to the arrangement pitch length in the horizontal direction of the flat convex lenses or the pitch length in the horizontal direction of the image for observing virtual image, and, a difference between an arrangement pitch length in a vertical directional of the flat convex lenses and a pitch length in a vertical direction of the image for observing virtual-image formed repeatedly on the image forming layer is in a range of not more than 10% with respect to the arrangement pitch length in the vertical direction of the flat convex lenses or the pitch length in the vertical direction of the image for observing virtual image, the plurality of images for observing virtual image are composed of groups of images for observing stand still virtual image each group including a predetermined number of images for observing stand still virtual image at an end portion of the group of images for observing virtual image, the image for observing stand still virtual image is provided with an enlarged portion, and at least one or more of the images for observing stand still virtual image, located on the end portion side of the group of images for observing virtual image, among the images for observing stand still virtual image are provided with cutouts at both end portions in a vertical direction with respect to a direction along which the images for observing virtual image are arranged side by side.

21. The image display sheet according to claim 20, wherein;

the plurality of images for observing virtual image are composed of groups of images for observing stand still virtual image each group including a predetermined number of images for observing stand still virtual image at an end portion of the group of images for observing virtual image, the image for observing stand still virtual image is provided with an enlarged portion on the side of the image for observing virtual image which is not the image for observing stand still virtual image, and at least one or more of the images for observing stand still virtual image, located on the end portion side of the group of images for observing virtual image, among the images for observing stand still virtual image are provided with cutouts at both end portions in a vertical direction with respect to a direction along which the images for observing stand image are arranged side by side.

* * * * *